(12) United States Patent
Edgar et al.

(10) Patent No.: US 7,035,961 B2
(45) Date of Patent: Apr. 25, 2006

(54) PHYSICAL ZONE TABLE FOR USE WITH SURFACE-BASED SERPENTINE FORMAT

(75) Inventors: Brian Thomas Edgar, Eden Prairie, MN (US); Bang Cong Nguyen, Oklahoma City, OK (US); Jimmie R. Shaver, Yukon, OK (US); Mark Alan Heath, Oklahoma City, OK (US); Mark Allen Gaertner, Vadnais Heights, MN (US); Kenneth Lawrence Barham, Oklahoma City, OK (US)

(73) Assignee: Seagate Technologgy LLC, Scotts Valley, CA (US)

(*) Notice: Subject to any disclaimer, the term of this patent is extended or adjusted under 35 U.S.C. 154(b) by 318 days.

(21) Appl. No.: 10/078,217

(22) Filed: Feb. 15, 2002

(65) Prior Publication Data

US 2003/0065872 A1 Apr. 3, 2003

Related U.S. Application Data

(60) Provisional application No. 60/308,777, filed on Jul. 30, 2001.

(51) Int. Cl.
*G06F 12/00* (2006.01)
(52) U.S. Cl. ............................ 711/4; 711/112; 711/114; 360/53

(58) Field of Classification Search ................ 711/4, 711/112, 201, 202, 154, 156, 206, 217–218; 369/53.2, 33.9, 59.26, 275.4, 275.3, 4, 280; 428/141, 328, 694 BS, 694 SG, 900; 360/48–53, 360/75, 63
See application file for complete search history.

(56) References Cited

U.S. PATENT DOCUMENTS

| | | | | |
|---|---|---|---|---|
| 5,758,151 | A * | 5/1998 | Milligan et al. | 707/100 |
| 5,760,993 | A | 6/1998 | Purkett | 360/78.08 |
| 5,983,309 | A * | 11/1999 | Atsatt et al. | 711/4 |
| 6,094,317 | A * | 7/2000 | Chung | 360/53 |
| 6,105,104 | A * | 8/2000 | Guttmann et al. | 711/4 |
| 6,202,118 | B1 * | 3/2001 | Klein | 711/4 |
| 6,278,566 | B1 * | 8/2001 | Blumenau | 360/48 |
| 6,462,896 | B1 * | 10/2002 | Codilian et al. | 360/48 |
| 6,480,949 | B1 * | 11/2002 | Wilson et al. | 711/206 |
| 6,728,054 | B1 * | 4/2004 | Chng et al. | 360/63 |
| 2002/0073270 | A1 * | 6/2002 | Benson | 711/102 |
| 2002/0141099 | A1 * | 10/2002 | Ng et al. | 360/75 |
| 2005/0097267 | A1 * | 5/2005 | Chen et al. | 711/112 |

* cited by examiner

*Primary Examiner*—Donald Sparks
*Assistant Examiner*—Hashem Farrokh
(74) *Attorney, Agent, or Firm*—Shumaker & Sieffert, P.A.

(57) ABSTRACT

A system and method for accessing data stored on surfaces of discs in a disc drive utilizing more than one serpent per recording zone. The serpents are traversed using a defect descriptor table and one or more physical zone tables (PZTs). An Address Translation Logic Unit is configurable to use one or more PZTs to access multiple serpents per recording zone.

24 Claims, 15 Drawing Sheets

802 ↘

| bit | field | bit |
|---|---|---|
| 15 | Reserved | 8 |
| 7 | Reserved | 0 |
| 7 | ZStartHead | 0 |
| 11 | #Cyl | 4 |
| 3 | #Cyl | 0 | 11 | #PBA_Track | 8 |
| 7 | #PBA_Track | 0 |
| 15 | ZStartCyl | 8 |
| 7 | ZStartCyl | 0 |
| 31 | CSlip | 16 |
| 15 | CSlip | 8 |
| 7 | CSlip | 0 |
| 31 | ZStartLBA | 24 |
| 23 | ZStartLBA | 16 |
| 15 | ZStartLBA | 8 |
| 7 | ZStartLBA | 0 |

900 ↘

| Reserved 902 | ZStartHead 906 | #Cyl 908 | #PBA_Track 910 | ZStartCyl 912 | Cslip 914 | ZstartLBA 916 |
|---|---|---|---|---|---|---|

FIG. 9

PHYSICAL ZONE TABLE FOR USE WITH SURFACE-BASED SERPENTINE FORMAT

RELATED APPLICATIONS

This application claims priority of U.S. provisional application Serial No. 60/308,777, filed Jul. 30, 2001.

FIELD OF THE INVENTION

This application relates generally to disc drives and more particularly to a unique physical zone table for addressing disc locations for use with a surface-based serpentine format.

BACKGROUND OF THE INVENTION

Computers typically include a host central processing unit ("CPU") and a persistent storage device such as a hard disc drive storage unit. Typically the hard disc drive unit includes one or more discs, each having two storage surfaces whereon addressable tracks and storage sectors are defined. The collection of all tracks having the same track number on the various surfaces defines a storage cylinder. The hard disc drive unit includes a read/write head for accessing data to be stored or read from each disc storage surface.

A hard disc controller is coupled between the CPU and the hard disc to control the flow of data between the CPU and hard disc, and to control positioning of the hard disc read/write heads for accessing desired hard disc sectors. Data that the host CPU wants to store on the disc memory is first stored in a buffer memory within the controller. The controller then reads the buffer memory and writes the data to the hard disc at storage locations specified by the host CPU. Data that the host wants to retrieve from the disc memory are requested by the host CPU and retrieved from disc to the buffer memory by the disc controller. The data are then sent to the host by the disc controller via an interface.

The physical geometry of a hard disc surface refers to the disc drive configuration, including the number of tracks or cylinders, sectors per track, and heads. Due to limitations in some host system software, not all disc drive physical geometries are supported. Consequently, to promote compatibility with such host systems, the disc drive software often emulates a given physical geometry. Such emulated geometry is termed logical disc geometry to differentiate it from the physical or actual geometry of a disc drive.

Historically and continuing to the present, the host CPU specifies memory storage locations in terms of physical hard disc addresses, for example, by specifying hard disc cylinder, head and sector (collectively, "CHS") whereat desired data are to be found or stored. Also, different systems will provide different types of addressing. For example, a CPU may supply through a host interface either a logical CHS (LCHS) or a logical block address (LBA). In either case, it is necessary that the disc controller be able to translate the received address into a physical address for accessing the disc drive. The necessary physical-to-logical address conversions take place under control of a local microprocessor associated with the hard disc controller unit. Generally, to be competitive in the commercial market place, the local microprocessor is a relatively inexpensive, low performance component.

Atsatt, et. al. disclosed a method and system for high-speed address translation with defect management in U.S. Pat. No. 5,983,309 (the Atsatt patent). The Atsatt patent discloses utilizing a physical zone table to translate logical addresses to physical addresses using a serpentine recording scheme, wherein all data on a given surface is transferred, within a recording zone, before switching heads. However, the Atsatt Patent did not contemplate multiple-serpent recording schemes wherein more than one serpent may be employed within a recording zone. In other words, the physical zone table of Atsatt is applicable only when there is one serpent per recording zone.

Also, it is likely that there will be defective sectors on a drive. Consequently, the disc controller will need to provide defect management in combination with logical-to-physical address translation. Another problem that has been encountered involves the use of conventional hardware to implement multiple serpents per zone. For example, traditional application specific integrated circuit (ASIC) hardware supports only the 'down' direction of serpents. Additionally, the physical zone table described in the Atsatt Patent has a maximum indexable range of only 256 entries.

Accordingly, there is a need for a method and apparatus for converting between physical LBAs and CHS addresses with defect management, when a surface-based multiple-serpent recording scheme is employed. Preferably, the method and apparatus will be capable of overcoming certain hardware limitations.

SUMMARY OF THE INVENTION

Against this backdrop the present invention has been developed. An embodiment of the present invention includes unique methods and systems for quickly storing and retrieving data from discs in a disc drive. More specifically, an embodiment includes a surface-based serpentine format wherein serpents within a recording zone are traversed using a defect descriptor table and one or more physical zone tables.

These and various other features as well as advantages which characterize the present invention will be apparent from a reading of the following detailed description and a review of the associated drawings.

BRIEF DESCRIPTION OF THE DRAWINGS

FIG. 9 illustrates a PZT data format in an embodiment utilizing multiple PZTs to address multiple serpents in a recording zone.

DETAILED DESCRIPTION

Figure 1:
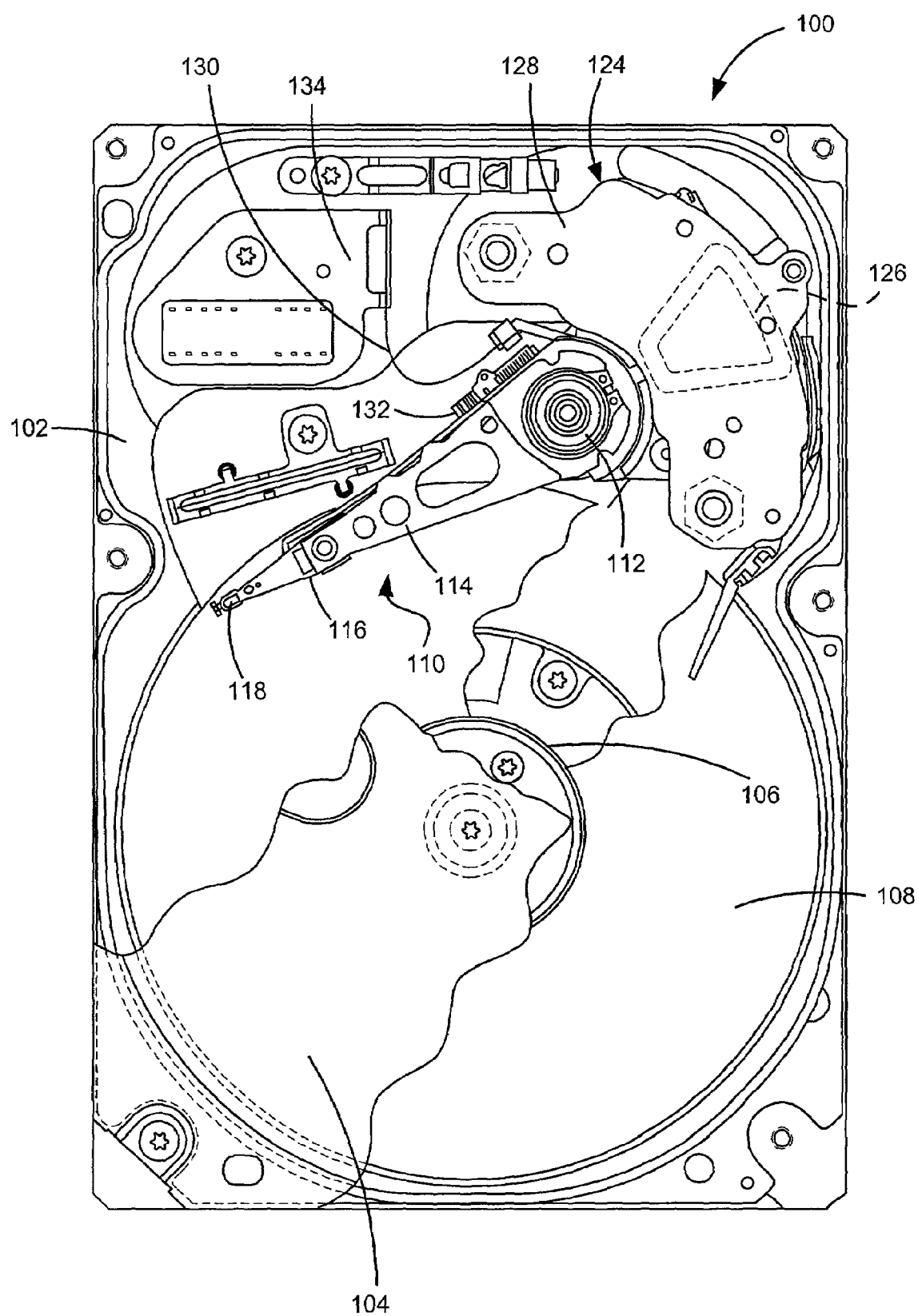
FIG. 1 is a plan view of a disc drive incorporating a preferred embodiment of the present invention showing the primary internal components.

The invention is described in detail below with reference to the drawing figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones (not shown) near the inner diameter of the discs 108 when the drive motor is de-energized. The heads 118 are secured over the park zones (not shown) through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
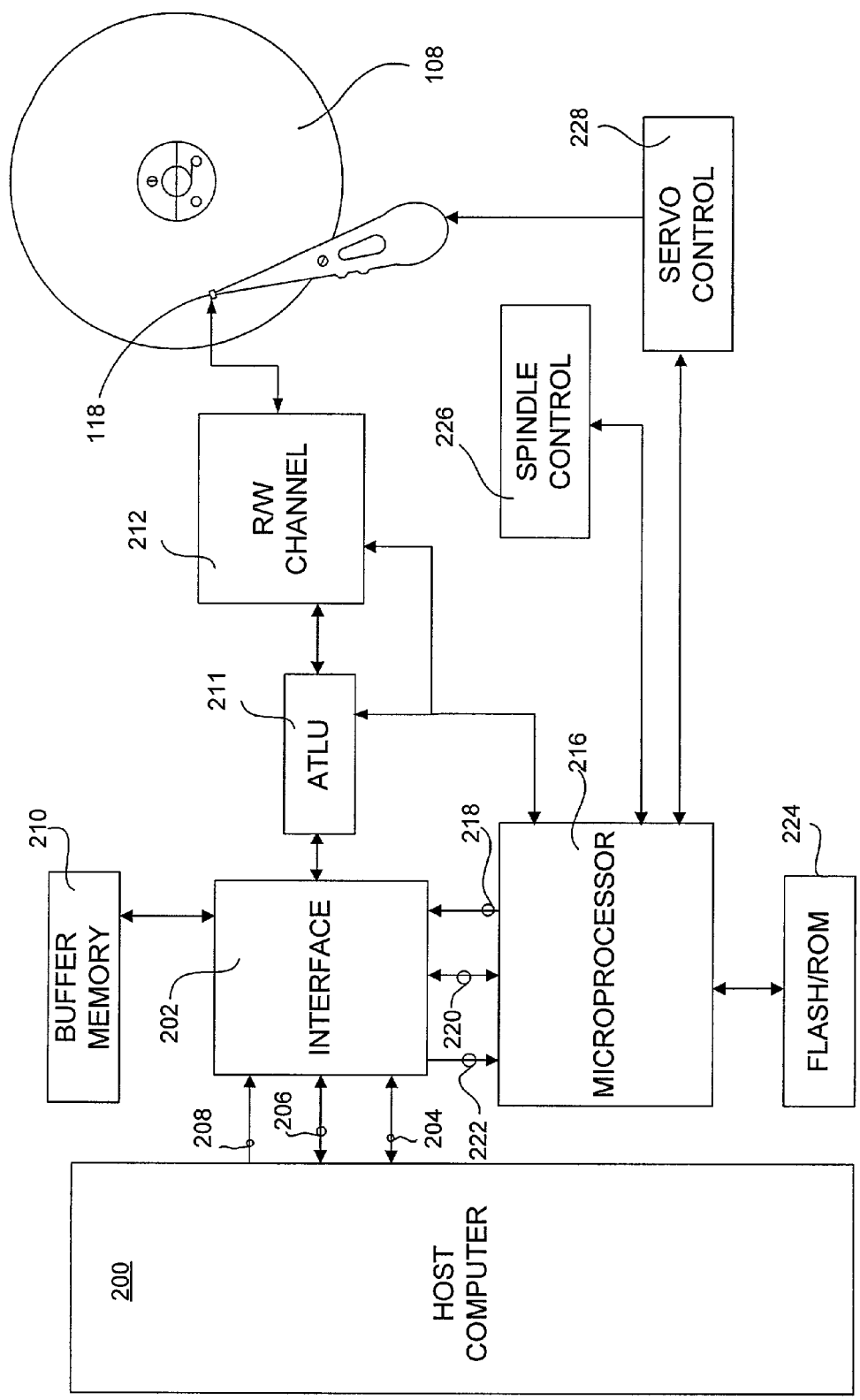
FIG. 2 is a functional block diagram of the disc drive of FIG. 1 in accordance with a preferred embodiment of the present invention.

FIG. 2 is a functional block diagram of the disc drive 100 of FIG. 1, generally showing the main functional circuits which are typically resident on a disc drive printed circuit board and which are used to control the operation of the disc drive 100. As shown in FIG. 2, the host 200 is operably connected to an interface application specific integrated circuit (interface) 202 via control lines 204, data lines 206, and interrupt lines 208. The interface 202 typically includes an associated buffer 210 that facilitates high-speed data transfer between the host 200 and the disc drive 100. Data to be written to the disc drive 100 are passed from the host 200 to the interface 202 and then to an address translation logic unit (ATLU) 211, which translates logical addresses into physical CHS (PCHS) addresses. The ATLU 211 and the processes involved in translating logical addresses to PCHS addresses is discussed in more detail throughout this specification, as well as in U.S. Pat. No. 5,983,309 issued Nov. 9, 1999 to Atsatt et al., which is hereby incorporated by reference for all that it teaches and discloses. Integrated in the ATLU 211 may also be a media manager and a formatter, which are discussed in U.S. Pat. No. 5,983,309. The ATLU 211 is uniquely adapted in an embodiment of the present invention to enter a surface serpentine mode wherein multiple serpents are utilized in each recording zone. The ATLU 211 enters surface serpentine mode when the microprocessor 216 stores a designated value in a configuration register of the ATLU 211.

The interface 202 provides a logical address to the ATLU 211 from the host computer 200. The type of address provided depends on the host interface 202. The address is typically a logical address, such as a logical cylinder-head-sector (LCHS) or a logical block address (LBA). To address a location on the data disc 108, the address provided by host interface 202 is converted into a PCHS. If a LCHS is received by the ATLU 211, the LCHS is translated into a LBA, then to a physical block address (PBA), and then to a PCHS. If an LBA is received by the ATLU 211, the LBA is translated to a PBA and then to a PCHS.

The interface 202 is in operable communication with a read/write channel 212, which encodes and serializes the data. The read/write channel 212 also provides the requisite write current signals to the heads 118. To retrieve data that has been previously stored by the disc drive 100, read signals are generated by the heads 118 and provided to the read/write channel 212, which processes and outputs the retrieved data to the interface 202 for subsequent transfer to the host 200. Such operations of the disc drive 100 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via control lines 218, data lines 220, and interrupt lines 222. The microprocessor 216 provides top level communication and control for the disc drive 100 in conjunction with programming for the microprocessor 216 which is typically stored in a microprocessor memory (MEM) 224. The MEM 224 can include random access memory (RAM), read only memory (ROM), and other sources of resident memory for the microprocessor 216. Additionally, the microprocessor 216 provides control signals for spindle control 226, and servo control 228.

Figure 3:
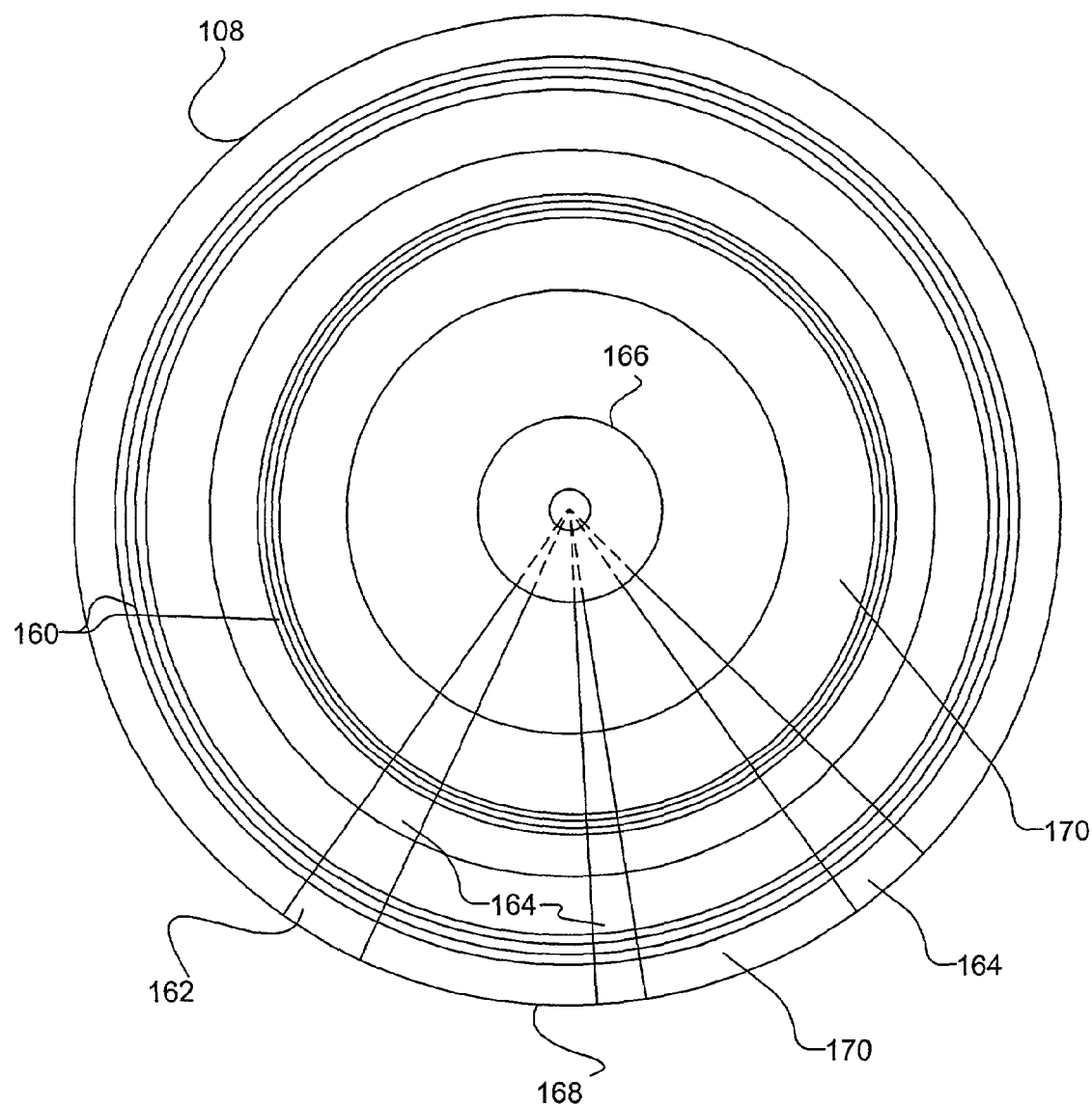
FIG. 3 depicts a plurality of concentric tracks on a disc of the disc drive, illustrating the manner in which data is stored on the disc.

Referring now to FIG. 3, shown therein is a plan view of the disc 108, generally showing the main components on the surface of the disc 108. The discs 108 are circumferentially divided into a plurality of concentric circular tracks 160. The number of tracks 160 per disc 108 will vary with each particular manufactured disc 108. A one-time revolution (INDEX) around each track 160 is typically indicated by an index mark 162 that extends the radius of the disc 108. The tracks 160 are in groups, called recording zones 170, in which the recording frequency is substantially the same among the tracks 160. Each disc 108 generally has two surfaces and generally, multiple discs 108 are mounted in vertical alignment, such that each set of vertically aligned concentric circular tracks 160 form a cylinder.

The disc 108 is radially divided into a plurality of servo segments 164. Typically, the servo segments 164 begin near the inner edge 166 of the annular disc 108 and terminate near the outer edge 168 of the disc 108. As with the number of tracks 160 per disc 108, the number of servo segments 164 per disc 108 varies with each particular manufactured disc 108. Each track 160 is composed of spaced servo segments 164 with data sectors between the servo segments 164.

Figure 4:
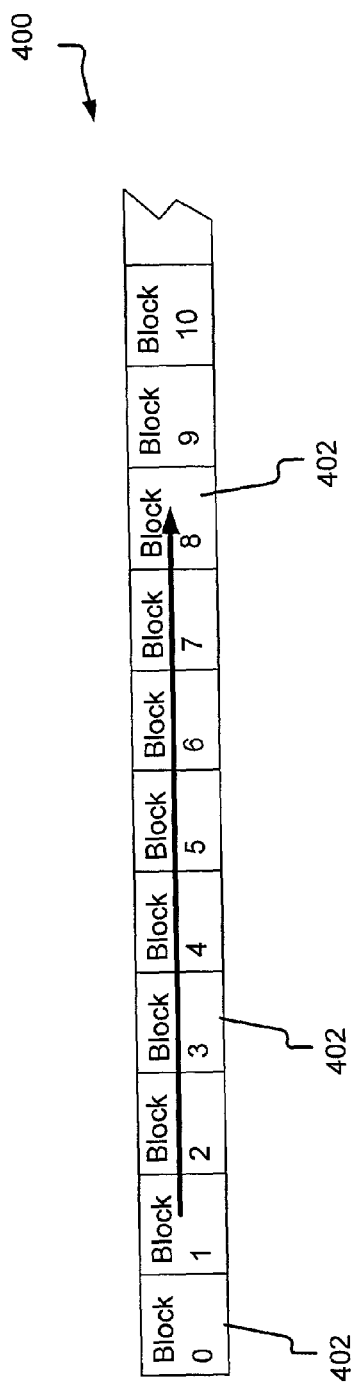
FIG. 4 illustrates logical blocks sequentially aligned as they may be presented by the disc drive shown in FIG. 1 in an embodiment of the present invention.

FIG. 4 illustrates a sequence 400 of data blocks 402 in a logical sequence as they may be viewed by the host computer 200 shown in FIG. 2 in an embodiment of the present invention. Each data block is typically 512 bytes in size. The data blocks 402 are logically arranged using logical block addresses (LBAs). Each LBA corresponds to a physical location on the data disc. The physical location on the disc is generally represented by a cylinder, head, and sector (CHS). Conversion from LBA to CHS and vice versa takes a certain amount of processor time that impacts the data rate. Additionally, moving the disc heads from one CHS to another CHS using track seeks and head switches takes time that impacts the data rate. Advantageously, an embodiment of the present invention addresses both the delay due to LBA to CHS conversion and CHS access.

Figure 5:
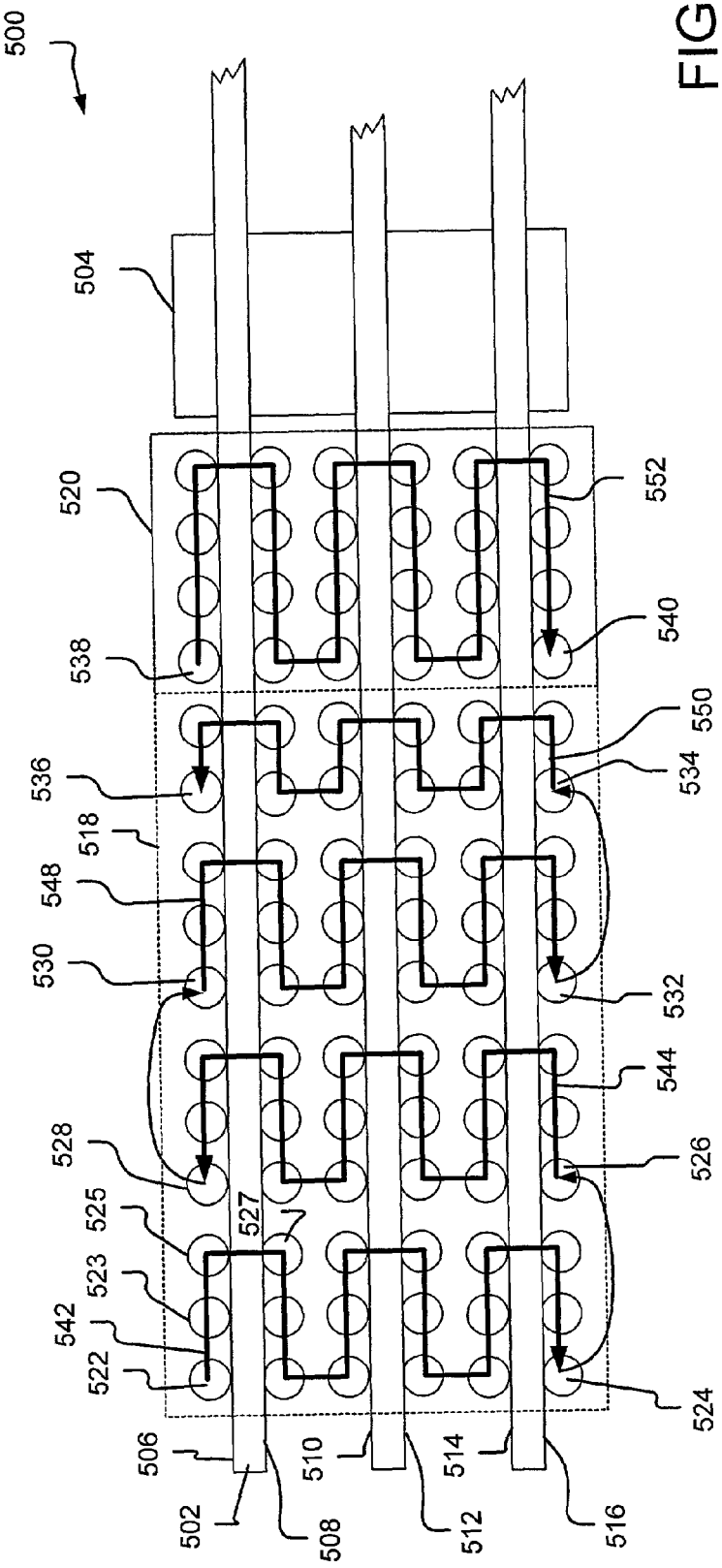
FIG. 5 illustrates a three-disc assembly and an exemplary surface-based serpentine recording scheme used in an embodiment of the present invention.

FIG. 5 illustrates a portion of a spindle hub assembly 500 having three discs 502 and an exemplary surface-based serpentine recording scheme used in an embodiment of the present invention. Three discs 502 are shown rotatably mounted to a spindle motor 504 around which the discs 502 may rotate to access data recorded on the discs 502. Each of the discs 502 has a top surface 506, 510, and 514. Each of the discs 502 also has a bottom surface 508, 512, and 516. The disc surfaces 506, 508, 510, 512, 514, and 516 include data tracks, such as the data track 522, 524, and 540. For illustrative purposes the data tracks in FIG. 5 are shown as having height and are shown in a cross-sectional view. While the spindle hub assembly 500 depicts fifteen tracks per surface, it is to be understood that each disc surface typically includes thousands of data tracks.

Also shown in FIG. 5 are two recording zones 518 and 520. Each recording zone includes a number of vertically aligned data tracks (i.e., cylinders). While FIG. 5 illustrates only two recording zones in the spindle hub assembly 500, it is to be understood that a typical spindle hub assembly 500 will include more than two recording zones. Typically a disc drive will include ten to twenty recording zones. As mentioned with regard to FIG. 4, LBAs are mapped to CHS locations on the discs 502 of the spindle hub assembly 500. To improve the data rate, the CHS access time is reduced by employing a unique surface-based serpentine format illustrated in FIG. 5.

The recording zone 518 includes four serpents 542. The serpent 542 begins at track 522 and proceeds through track 524. A next serpent 544 begins at track 526 and proceeds through track 528. A third serpent 548 begins at track 530 and proceeds through track 532. A fourth serpent 550 in recording zone 518 begins at track 534 and ends at track 536. The serpents are traversed to access data at CHS addresses, which correspond to PBAs, which in turn correspond to LBAs. During an operation in which the corresponding LBAs are accessed in sequential order, the serpent 542 is traversed first, followed by the serpent 544, followed by serpent 548, followed by the serpent 550. The tracks in the recording zone 520 are accessed next by traversing a serpent 552 that begins at track 538 and ends at track 540. The surface-based serpentine format illustrated in FIG. 5 is particularly useful for improving the sequential data rate when the disc drive servo system is capable of switching tracks on the same surface (such as 523 and 525) faster than switching to a track using a different head (such as tracks 525 and 527).

To illustrate how a serpent (and a recording zone) is traversed, exemplary steps of traversing the serpent 542 are described. During operation the serpent 542 is traversed in the following manner. First, a transducer head adjacent to the surface 506 is used to read from or write to the useable data sectors in the track 522. When the useable data sectors in the track 522 have been accessed, the head adjacent to the surface 506 proceeds to a track 523 to access all the useable data sectors in the track 523. After all the useable data sectors in the track 523 have been accessed, the head adjacent to the surface 506 seeks to the track 525 to access all the useable data sectors in the track 525. To determine whether a sector is useable, a defect descriptor table (DDT) may be employed, such as the DDT shown in FIG. 13, which is discussed further below.

After the useable data sectors in the track 525 have been accessed, a head switch is performed to switch from the head adjacent to the surface 506 to the head that is adjacent to the surface 508. The head that is adjacent to the surface 508 then accesses all the useable data sectors in the track 527. Traversing the serpent 542 continues in a similar fashion until the useable data sectors in the track 524 have been accessed. The other serpents (544, 548, 550, and 552) are traversed in a similar fashion. Generally, a vertical line in the serpents 542, 544, 548, 550, and 552, indicates a head switch. A horizontal line in the serpents 542, 544, 548, 550, and 552, indicate a track seek with the current head. Any of the head switches (i.e., vertical lines) may also be accompanied by a seek to a physical track.

Figure 6:
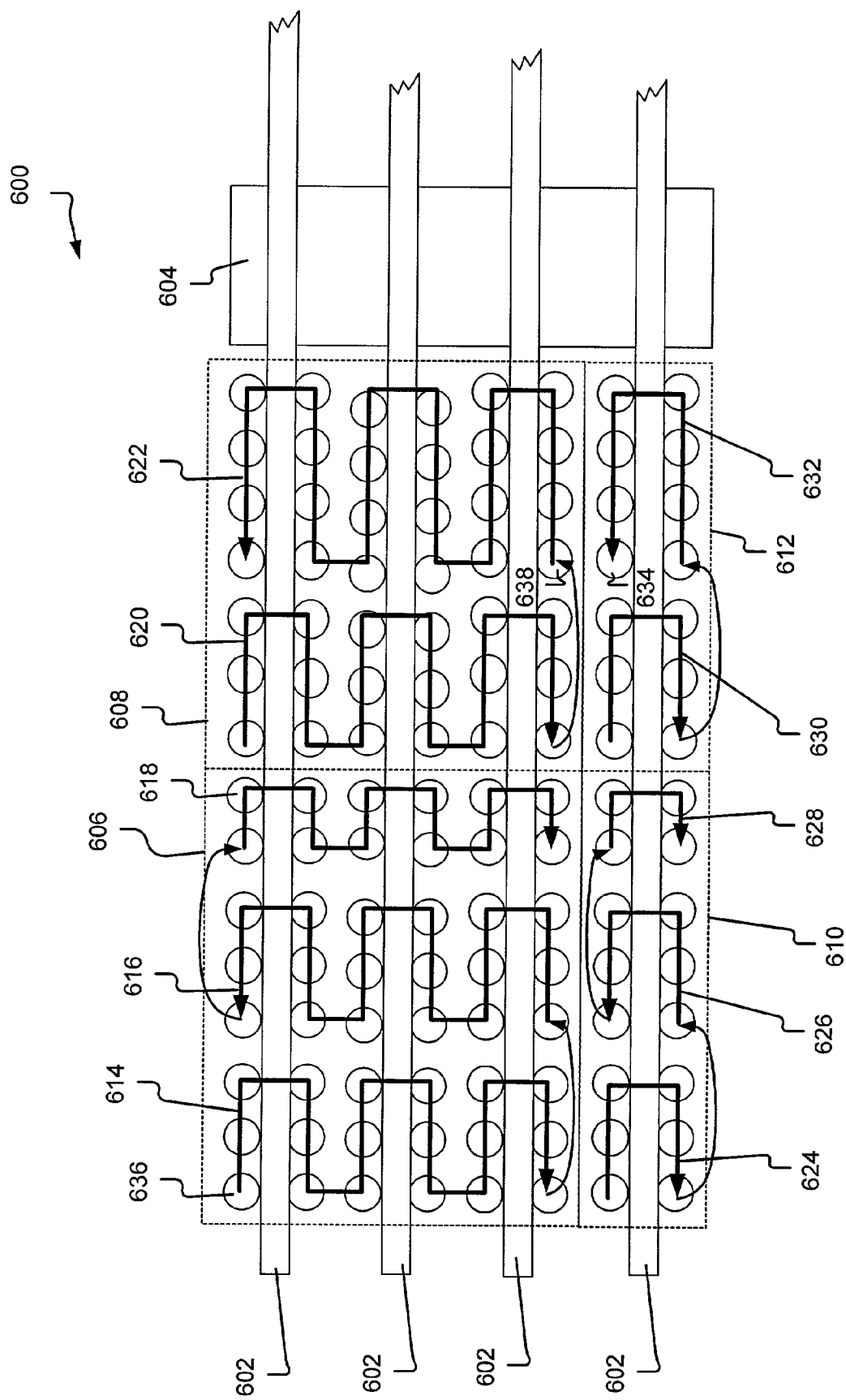
FIG. 6 illustrates a spindle hub assembly having four discs mounted to a spindle motor using an exemplary embodiment of the present invention.

FIG. 6 illustrates a portion of a spindle hub assembly 600 having four discs 602 rotatably mounted to a spindle motor 604 using an exemplary embodiment of the present invention. Four recording zones 606, 608, 610 and 612 each include varying numbers of track cylinders and they are positioned both horizontally and vertically relative to each other, to illustrate one example of a surface-based serpentine format. In the recording zone 606, physical CHS locations are accessed by transducer heads traversing serpents 614, 616, and 618. In the recording zone 608, physical CHS locations are accessed by transducer heads traversing serpents 620 and 622. In the recording zone 610, physical CHS locations are accessed by transducer heads traversing serpents 624, 626, and 628. In the recording zone 612, serpents 630 and 632 are accessed. The serpents shown in FIG. 6 are traversed in a manner similar to the manner described in FIG. 5. In all embodiments described herein, the order of traversing the recording zones 170 is adjustable depending on the implementation in order to optimize selected performance criteria, such as the data rate. In general, during an operation that accesses the disc drive's LBAs in sequential order, it is to be understood that all of the useable sectors in a recording zone are accessed before sectors in another recording zone are accessed. This is true to the extent allowed by certain considerations such as but not limited to LBA reassignment.

Figure 7:
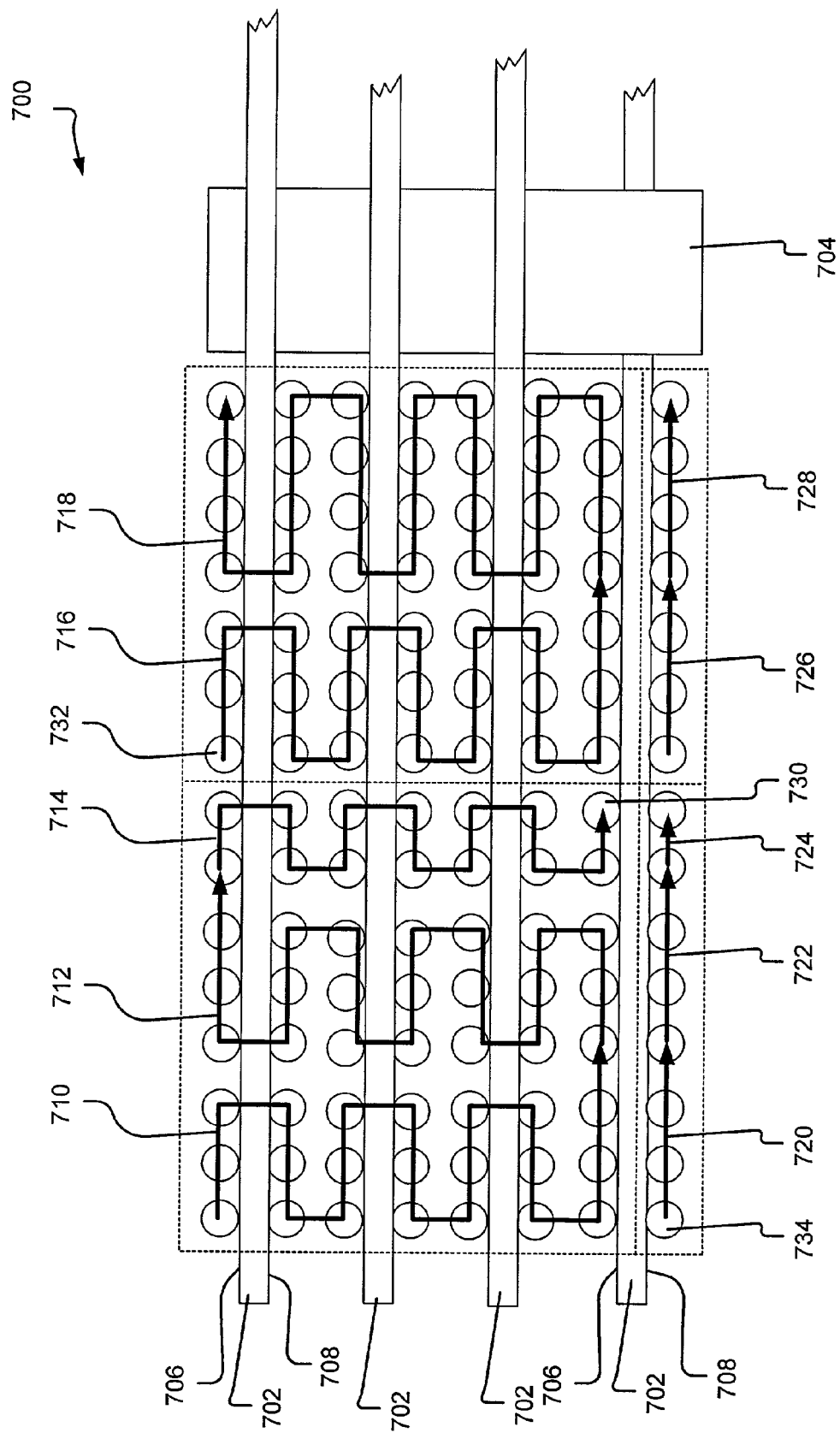
FIG. 7 illustrates a spindle hub assembly having four discs mounted to a spindle motor employing an exemplary embodiment of the present invention.

FIG. 7 illustrates four recording zones contained in a portion of a spindle hub assembly 700 having four discs 702 rotatably mounted to a spindle motor 704. Each disc has a top surface 706 and a bottom surface 708. The surfaces 706 and 708 include data tracks for storing and retrieving data to and from the discs. Accessing the CHS locations in the discs 702 involves traversing a number of serpents 710, 712, 714, 716, 718, 720, 722, 724, 726 and 728, in a manner similar to the manner described in FIG. 5. The exemplary surface-based serpentine format illustrated in FIG. 7 includes serpents 720, 722, 724, 726 and 728, which do not involve a head switch but rather only track seeks in traversing those serpents. After serpent 714 is traversed, a head switch may be performed from track 730 to track 732 to begin traversing serpent 716. Alternatively, after serpent 714 is traversed, a head switch may be performed to switch from track 730 to track 734 to begin traversing serpent 720. In general, the order of the recording zones' traversal is adjustable depending on the implementation in order to optimize selected performance criteria, such as the data rate.

The embodiments shown in FIGS. 5–7 are exemplary surface-based serpentine formats that may be used in an embodiment of the present invention. Given an LBA, a defect descriptor table such as the one shown in FIG. 13 can be used to compute a PBA and an index into a physical zone table. In order to convert the PBAs to physical CHS addresses, a unique method and system has been developed using physical zone tables (PZTs). In general, a PZT is a data structure that describes one or more physical regions in the disc drive, such as a recording zone or a serpent. The figures that follow illustrate methods and systems utilizing PZTs to rapidly convert PBAs to CHS addresses and vice versa for reading data from and writing data to discs in a disc drive.

Figure 8:
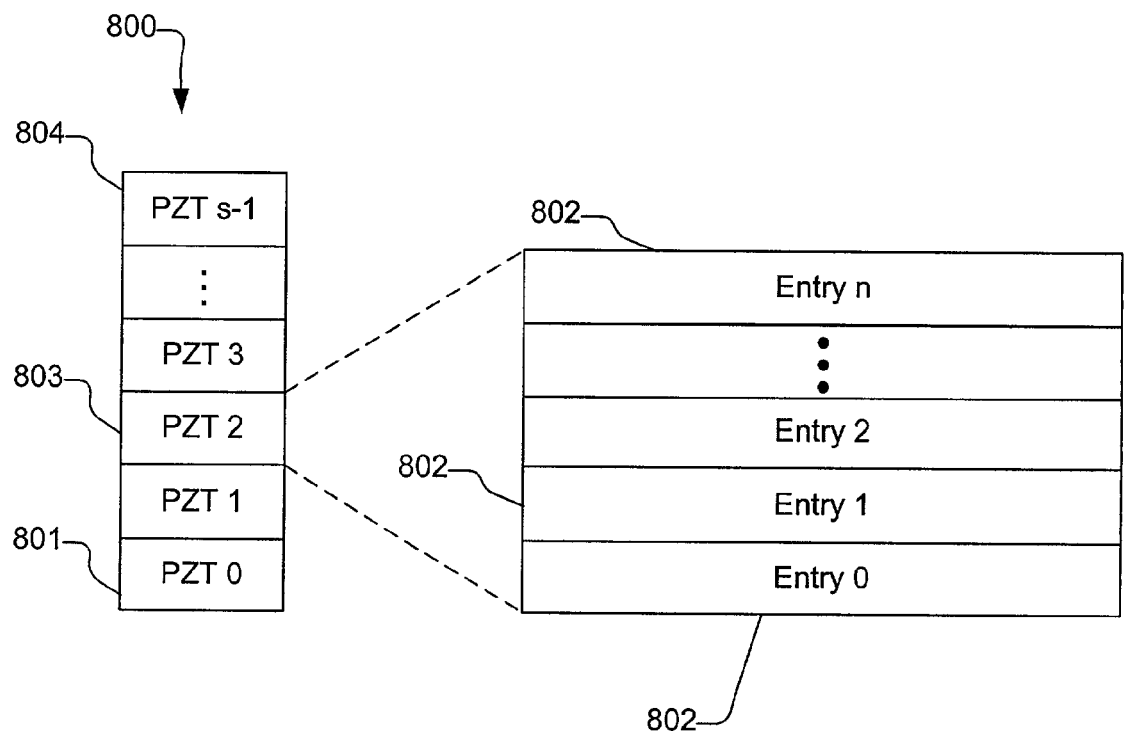
FIG. 8 illustrates a PZT in an embodiment of the present invention utilizing multiple PZTs to address multiple serpents in a recording zone.

FIG. 8 illustrates a plurality 800 of Physical Zone Tables (PZTs), including PZTs 801 and 803 and PZT entries 802 in accordance with an embodiment of the present invention. In one embodiment, each PZT entry 802 may be used to describe a single associated serpent. Each PZT 801 preferably includes at least 256 PZT entries. If a single PZT has as many entries as there are serpents on the disc drive 100, then a plurality 800 of PZTs is not needed. If certain considerations limit the size of a PZT, then multiple PZT entries 802 in multiple PZTs 801 may be used to describe all of the serpents in the disc drive 100. When multiple PZTs 801 are used, the correct PZT 801 is chosen prior to each translation (an operation with minimal time overhead). The choice of PZT 801 is indicated to the ATLU 211 by setting a PZT base pointer in the ATLU 211 prior to the address translation. If multiple PZTs 801 are required, it may be convenient to associate one PZT 801 with each recording zone 170, and to associate the PZT entries 802 with serpents on a one-to-one basis. It is to be understood that the PZTs 801 need not be contiguously arranged in memory. Other methods of arranging each of the PZTs 801 are envisioned and may be readily contemplated by those skilled in the art.

FIG. 9 illustrates an exemplary PZT entry format 900 which may be used in accordance with an embodiment of the present invention. Referring to FIGS. 8 and 9 in combination, each PZT 801 stores data used by the ATLU 211 (shown in FIG. 2) to support PBA to PCHS translations and to determine the end of a track during a data transfer. The plurality 800 of PZTs includes PZTs "PZT 0" 801 through "PZT s-1" 804, inclusive, where s is a positive integer greater than or equal to one and preferably represents the number of recording zones 170. The PZT 803 has an entry 802 for each of "n" serpents (e.g., 542 of FIG. 5) in a recording zone 170 on the disc 108 (shown in FIG. 3). In one embodiment, the disc drive 100 has a PZT 801 associated with each recording zone 170 in the disc drive 100. In this embodiment, each PZT entry 802 is preferably a multiple of sixteen bytes. Each PZT entry 802 has one or more fields as described by the exemplary data format 900. The PZT entry format 900 corresponds to a 16-byte PZT entry 802.

The PZT entry format 900 has a number of bits allocated for each field. A reserved field 902 is available for firmware. For example, the reserved field 902 may be used to store additional information with respect to a recording zone 170 (referenced in FIG. 3). As shown, the reserved field comprises two bytes in the PZT entry format 900. The starting head is given in a ZStartHead field 906. As shown, eight bits are allocated to the ZStartHead field 906 in the PZT entry format 900. The number of cylinders in a serpent 542 associated with the PZT entry 802 is located in the Cyl field 908. As shown, twelve bits are allocated to the Cyl field 908 in the PZT entry format 900. The number of PBAs per track in a serpent 542 is located in PBA_Track field 910. As shown, twelve bits are allocated to the PBA_Track field 910 in the PZT entry format 900.

A ZStartCyl field 912 provides the starting physical cylinder of the physical region (again, this is preferably a serpent) described by the PZT entry 802. As shown, sixteen bits are allocated to the ZStartCyl field 912 in the PZT entry format 900. A CSlip field 914 is the cumulative slip from the beginning of the data in the disc drive 100 to the start of a serpent 542. As shown, thirty-two bits are allocated to the CSlip field 914 in the PZT entry format 900. A ZStartLBA field 916 provides the LBA of the starting sector in a serpent 542. As shown, thirty-two bits are allocated to the ZStartLBA field 916 in the PZT entry format 900. In an alternative embodiment, the ZStartLBA field 916 and CSlip field 914 are replaced with a single ZStartPBA field. The ZStartPBA field is equal to the sum of the ZStartLBA field 916 and CSlip field 914, and represents the starting PBA of the physical region described by the PZT entry 802. The PZTs described in embodiments herein are stored in memory in the disc drive 100. The memory may be any type of memory media known in the art, including, but not limited to, hard disc media, Read Only Memory (ROM), or Electrically Erasable ROM (EEPROM). Additionally, the PZTs may reside on a disc 108 when the disc drive 100 is powered on and be copied to a faster memory media for use during disc drive 100 operation.

Figure 10:
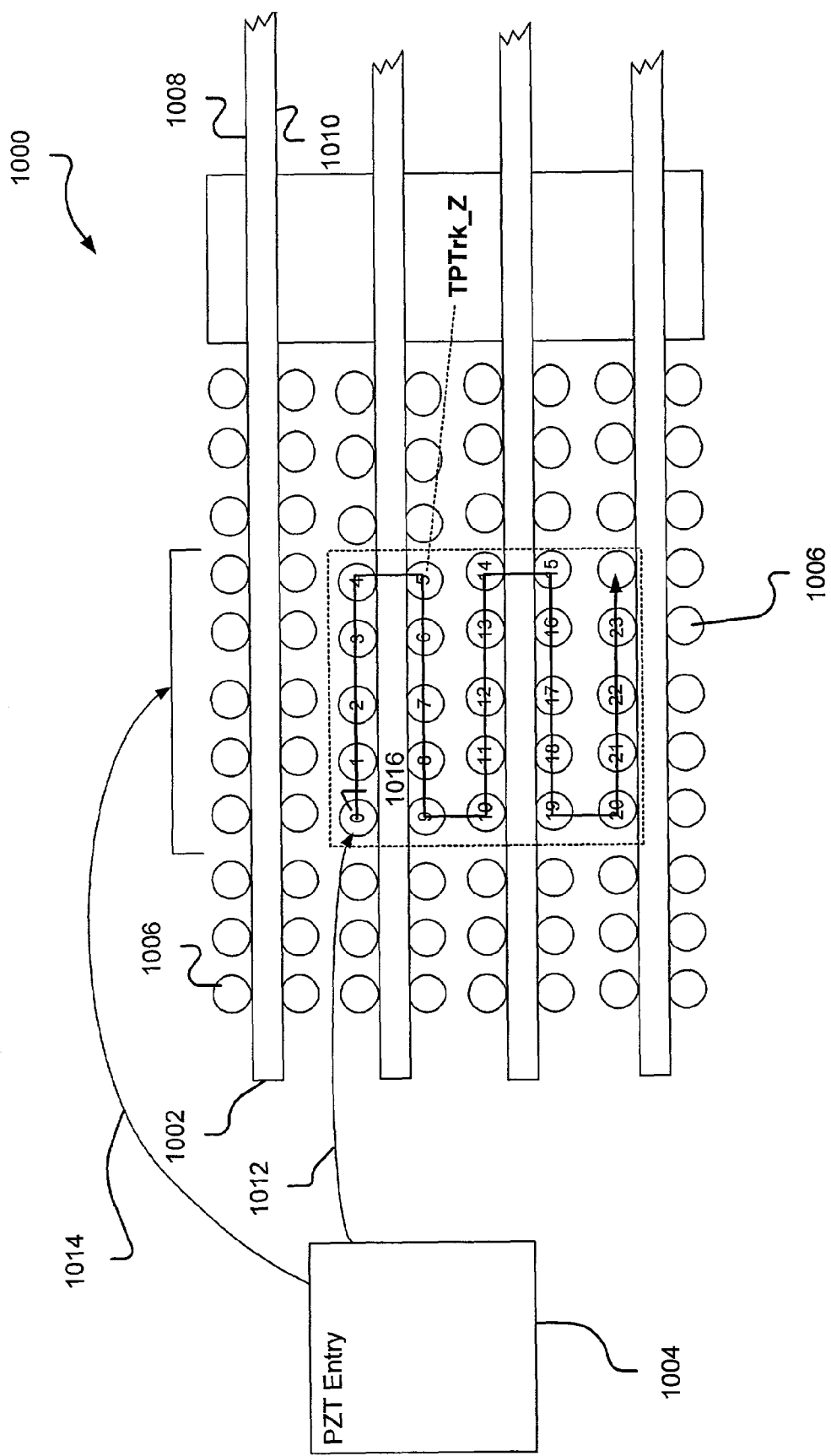
FIG. 10 illustrates a four-disc assembly with a surface-based serpentine recording scheme and a physical zone table (PZT) entry for accessing a serpent in an embodiment of the present invention.

FIG. 10 illustrates a portion of a spindle hub assembly 1000 having four discs 1002, physical regions of which are described using PZT entries 1004. Each PZT entry 1004 of FIG. 10 may have the same format 900 of PZT entry 802 illustrated in FIGS. 8–9, but may also be different in some respects. Different implementations of the PZT 801 may have different data and in different arrangements than those suggested by format 900 and PZT entry 802. As illustrated in other figures in the specification, recording tracks 1006 are illustrated as having height for illustrative purposes only. In addition, for illustration purposes only, only eleven tracks 1006 per surface 1008, 1010, are illustrated. In an actual disc drive, a recording surface 1008, 1010 will typically have thousands of recording tracks.

As described in FIGS. 8–9 with respect to PZT entries 802 and format 900, the data in PZT entry 1004 describes a corresponding serpent in a recording zone in the spindle hub assembly 1000. Preferably, each PZT entry 1004 includes a number of cylinders field (e.g., #Cyl 908 in FIG. 9) that indicates the number of cylinders in a corresponding serpent (as indicated by an arrow 1014). Additionally, each PZT entry 1004 includes data referencing a starting head and a starting cylinder (as indicated by an arrow 1012). Typically, in an actual embodiment, the firmware arranges a Defect Descriptor Table (DDT) (e.g., DDT 1300 in FIG. 13) to restrict the range of PBAs in which each PZT entry 1004 is used to support PBA to PCHS translation. This restriction can be used to control the vertical extent of the physical region described by PZT entry 1004.

As shown in FIG. 10, the number of cylinders field in the PZT entry 1004 indicates that the physical region (range of cylinders and heads) referred to by the PZT entry 1004 extends horizontally six cylinders as indicated by arrow 1014. Also shown with arrow 1012 is the association between the PZT entry 1004 and the starting track 1016, which is provided by the starting head and starting cylinder fields in the PZT entry 1004. To summarize in regards to the PZT entry 1004, the firmware's arrangement of the DDT and the number of cylinders field in the PZT entry 1004 determine the vertical and horizontal dimensions, respectively, of the physical region referred to by the PZT entry 1004. The starting cylinder and head fields from the PZT entry 1004 determine where the physical region is located.

Figure 11:
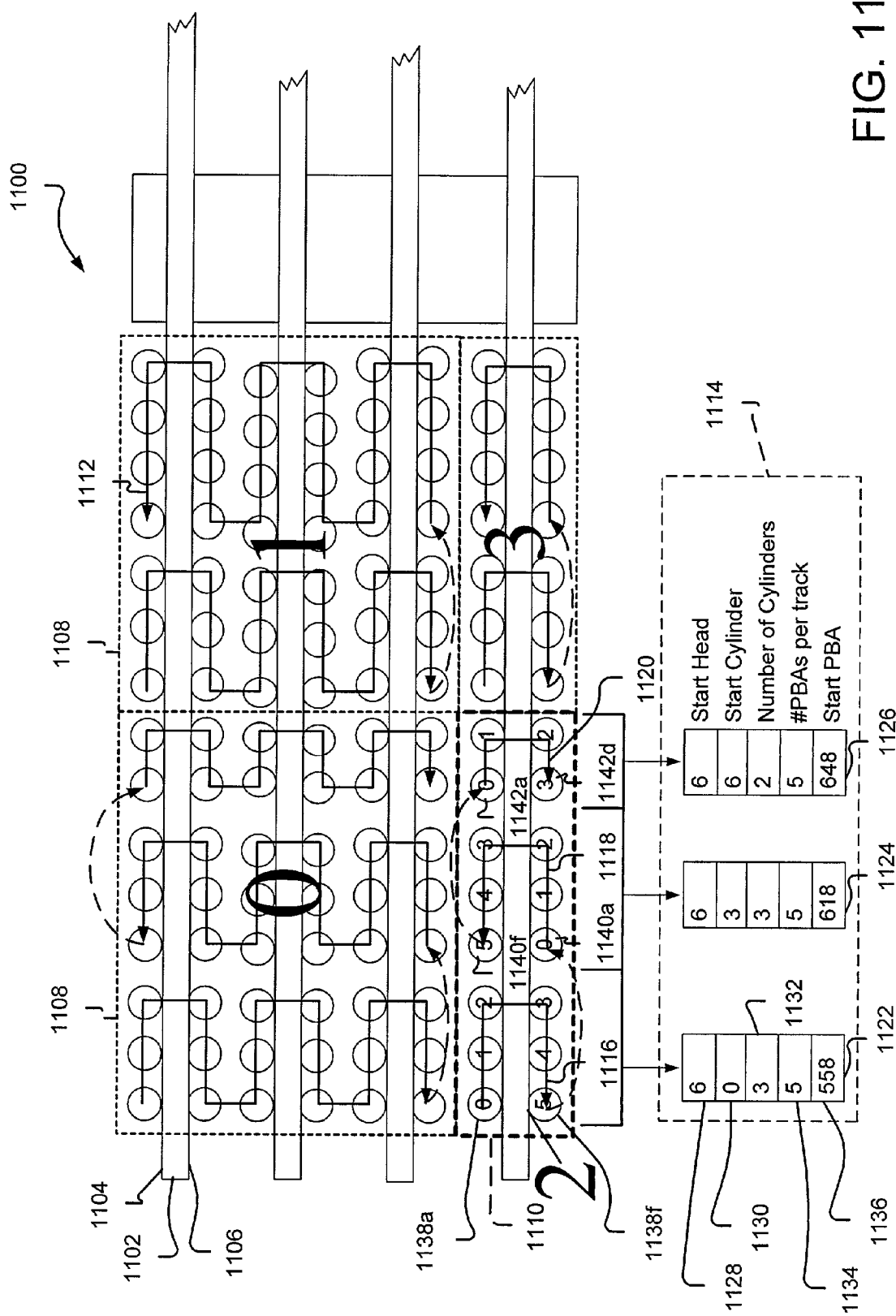
FIG. 11 illustrates a spindle hub assembly employing a surface-based serpentine recording scheme and a physical zone table (PZT) with three entries for accessing three serpents.

FIG. 11 illustrates a portion of a spindle hub assembly 1100 having four discs 1102, where each disc 1102 has a top surface 1104 and a bottom surface 1106. Each of four recording zones 1108 are contained in an associated cylinder range on the discs 1102, and each contain a number of serpents 1112 for accessing data on the discs 1102. Also shown in FIG. 11 is a physical zone table, PZT 1114, associated with recording zone 2(1110). The exemplary embodiment of FIG. 11 includes a recording zone 1110 that has 16 tracks, 5 PBA/track, 80 PBAs, and 55 LBAs. The embodiment of FIG. 11 is for illustrative purposes, to allow the reader to understand how the PZT 1114 may be used in operation to traverse the serpents 1112 on the disc surfaces (1104 and 1106).

Recording zone 2 (1110) has three serpents, serpent 1116, serpent 1118, and serpent 1120. Within a spindle hub assembly 1100, tracks can be addressed by cylinder and head. Once one or more PZTs have been established with at most one PZT per recording zone, and once a traversal mode (such as surface serpentine) has been selected, the same tracks can also be addressed by recording zone number, PZT entry index, and physical track offset. The physical track offset refers to the offset of a track from the beginning of the physical region (described by the associated PZT entry) along the path defined by the PZT entry and the selected traversal mode. This addressing convention, {recording zone, PZT entry index, physical track offset}, will be used to discuss the tracks in FIG. 11. The serpent 1116 covers track {2, 0, 0} (1138a), track {2,0,1} (1138b), track {2,0,2} (1138c), track {2,0,3} (1138d), track {2,0,4(1138e), and track {2,0,5} (1138f) of the left most set of cylinders in recording zone 2 (1110). The serpent 1118 covers track {2,1,0} (1140a), track {2,1,1} (1140b), track {2,1,2} (1140c), track {2,1,3} (1140d), track {2,1,4} (1140e), and track {2,1,5} (1140f) of the middle set of cylinders in recording zone 2 (1110). The serpent 1120 covers track {2,2,0} (1142a), track {2,2,1} (1142b), track {2,2,2} (1142c), and track {2,2,3} (1142d) of the right most set of cylinders in recording zone 2 (1110). Serpent 1116 is described by and associated with a PZT entry 1122 in the PZT table 1114. Serpent 1118 is described by and associated with a PZT entry 1124 in the PZT table 1114. Serpent 1120 is described by and associated with a PZT entry 1126 in the PZT table 1114. Each of the PZT entries 1122, 1124, and 1126 are used to translate PBAs to CHS locations on the discs 1102.

In the exemplary embodiment of the PZT 1114, each PZT entry 1122, 1124, and 1126, includes a number of fields useable by the ATLU (211 in FIG. 2) to access data on the disc 1102. The data fields in the exemplary PZT table 1114 are a start head field 1128, start cylinder field 1130, a number of cylinders field 1132, a PBAs per track field 1134, and a start PBA field 1136.

Advantages of the PZT 1114 utilized in the embodiment of FIG. 11 are readily apparent to those skilled in the art. For example, moving from one serpent (e.g., serpent 1116) to the next serpent (e.g., serpent 1118), does not involve a head switch, because serpents associated with odd PZT indices have the "up" direction. In some embodiments, the hardware for the ATLU 211 supports only the "down" direction of serpents, but in these embodiments, a simple firmware algorithm can be used to support the "up" direction of serpents (see Table 3 below). As a result of alternating between "up" and "down" serpents, serpent switching is more consistent. Additionally, embodiments of the PZT 1114 enable the use of non-uniform numbers of serpents per recording zone. For example, as shown in FIG. 10, recording zone 2 (1110) contains 2 serpents (serpents 1116 and 1118) of 3 cylinders and one serpent (serpent 1120) of two cylinders. The serpent 1120 may be referred to as a "nonstandard" serpent. Table 1 below is an exemplary algorithm for calculating the size of the "nonstandard" serpent in a recording zone:

TABLE 1

```
remainder_portion = (cylinders MODULO standard_serpent_size)
IF (remainder_portion > (standard_serpent_size / 2))
{
last_serpent_size = remainder_portion
}
ELSE
{
last_serpent_size = standard_serpent_size +
remainder_portion
}
``` where last_serpent_size is the number of cylinders in the last serpent in the zone, cylinders is the number of cylinders in the recording zone, standard_serpent_size is the number of cylinders desired in the standard serpents (i.e. the serpents other than the last serpent), and remainder_portion represents the result of the modulo function. One benefit of serpents having different cylinder sizes involves the disc drive development process, whereby the recording zone design may be less coupled to the design of the PBA to PCHS mapping system. In other words, the recording zone boundary selection does not need to be dependent upon the surface-based serpentine format selected. In one embodiment, if the remainder portion is greater than the standard serpent size divided by 2, the remainder_portion becomes the last serpent in the recording zone (e.g., serpent 1120). If the remainder_portion is less than or equal to half of the standard serpent size divided by two, the remainder_portion is combined with the last standard serpent to form a larger serpent (e.g., serpent 1112).

Figure 12:
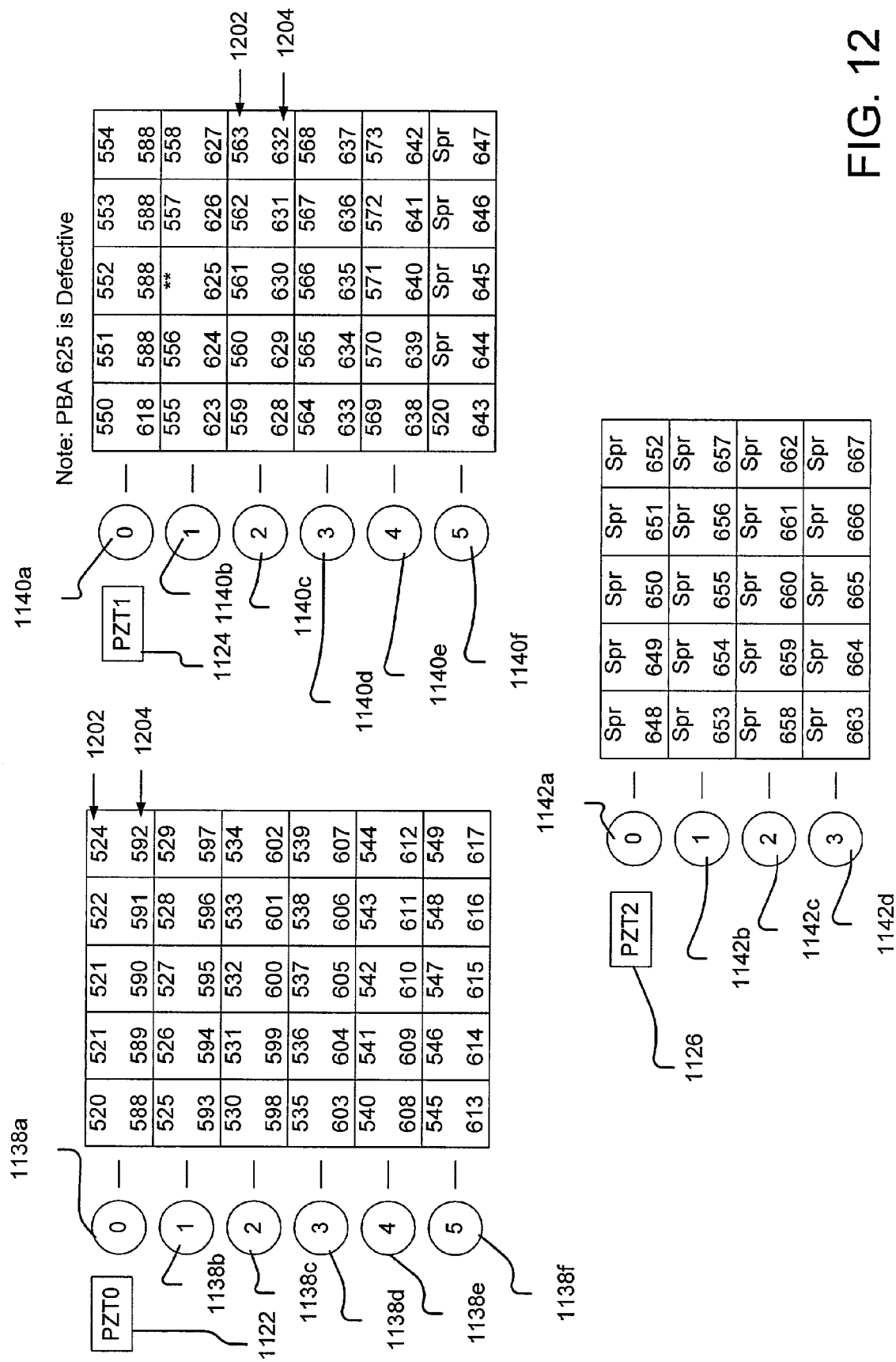
FIG. 12 illustrates a mapping of the PZT entries to PBAs with their associated LBAs in accordance with the embodiment shown in FIG. 11.

FIG. 12 illustrates how the PZT 1114 provides mapping from a PBA to a particular sector on a particular track in accordance with an embodiment of FIG. 11 for accessing recording zone 2 (1110). The PZT entries 1122, 1124, and 1126 are associated with tracks 1138a–1138f, 1140a–1140f, and 1142a–1142d, respectively. Each LBA 1202 corresponds to a PBA 1204, as shown in the illustration. Each PZT entry provides a PBA, starting head, starting cylinder, number of cylinders, and number of PBAs per track, to determine a CHS location associated with each PBA. The PBA 625 is defective (indicated by ) in the example illustrated in FIG. 12. As discussed below, the Defect Descriptor Table (1300 of FIG. 13) is used to translate target LBAs to target PBAs. Given a target PBA (TPBA), it should be clear that the information in the PZT entry 1122** is sufficient for the ATLU to compute the physical track offset of the track that contains the given PBA (this is FLOOR ((TPBA-PZT[i].ZStartPBA)/PZT[i].#PBA_Trk), and, subsequently, the cylinder and head addresses of the track with the computed physical track offset. The sector offset from the beginning of the track is given by the remainder from the above division.

Figure 13:
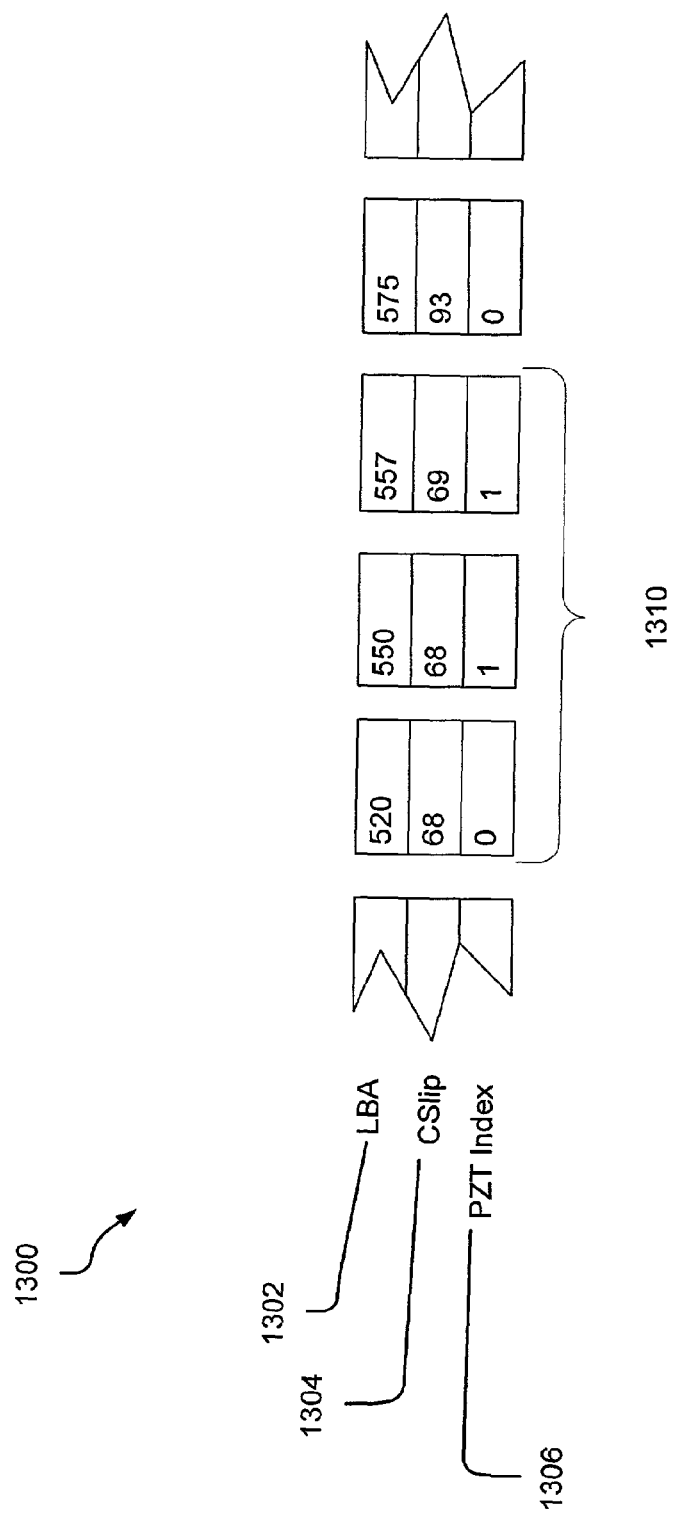
FIG. 13 illustrates an exemplary defect descriptor table (DDT) that may be used with the PZT of FIG. 11.

FIG. 13 illustrates a portion of an exemplary defect descriptor table (DDT) 1300 that may be employed by the disc drive 100. Generally, the DDT 1300 stores data that indicates defective sectors (CSlip values) as well as PZT index values associated with LBAs. The DDT 1300 has one entry for every LBA whose associated CSlip value or PZT index value differs from those of the previous LBA. The ATLU 211 computes the PBA associated with a target LBA by adding together the LBA and the CSlip value associated with that LBA. The ATLU 211 looks up the associated CSlip value in the DDT 1300 based on the target LBA. The ATLU 211 also looks up the associated PZT index in the DDT 1300 based on the target LBA. Referring again to FIG. 12, each LBA 1202 corresponds to a PBA 1204. It is the DDT 1300 that provides this mapping. In embodiments where each PZT entry is associated with a serpent, at least one DDT entry will exist for each serpent to which LBAs are mapped. A group of DDT entries 1310 applies to LBAs associated with zone 2 (recording zone 1110 of FIG. 11). During operation, for example, the ATLU 211 uses the DDT 1300 to select a PZT entry given a target LBA. The DDT 1300 includes LBA fields 1302. The ATLU 211 indexes into the DDT 1300 with the target LBA value using the LBA fields 1302. The DDT 1300 also includes CSlip fields 1304, which indicate the cumulative slip from the beginning of the disc 108 to the target LBA. A PZT index field 1306 contains PZT indices, which are used to index into the PZT (e.g., 1114) to access the data that may be used to compute the CHS associated with the target LBA. In embodiments with more than one PZT 1114, the controller firmware may indicate the appropriate PZT 1114 to the ATLU 211 prior to each address translation. Again, the selection of the appropriate PZT 1114 for use in translating a given target LBA is an operation with minimal time overhead.

Figure 15:
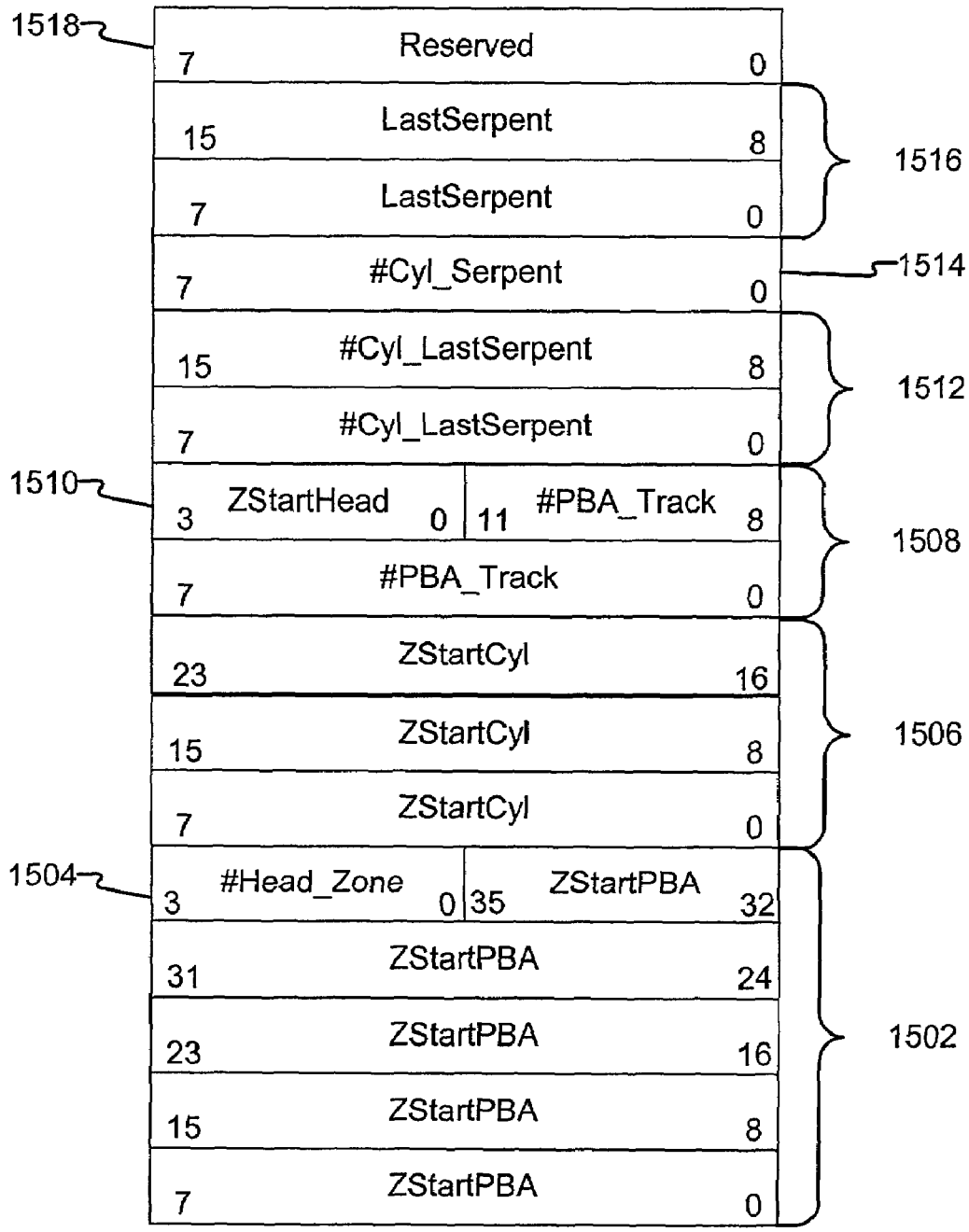
FIG. 15 illustrates a PZT in an embodiment of the present invention utilizing only one PZT to address multiple serpents in a recording zone.

FIG. 15 illustrates yet another embodiment of the PZT entry format wherein a single PZT may describe all of the disc drive's recording zones, even when a recording zone 170 includes more than one serpent, and even when a recording zone 170 includes a nonstandard serpent. When a single PZT is used to describe all of the disc drive's recording zones 170, it is not necessary to select a different PZT prior to each address translation. In this embodiment, a serpent may be viewed as accessing a portion of a recording zone 170. A PZT entry 1500 has fields 1502–1518 arranged in the exemplary format shown in FIG. 15. The PZT entry 1500 has a number of bits allocated for each field. A ZStartPBA field 1502 provides the starting PBA of a physical region z (preferably a recording zone). As shown, thirty-six bits are allocated to the ZStartPBA field 1502. A #Head_Zone field 1504 is the number of heads in the physical region z. This is a notable difference from the PZT entry format 900, wherein a field to indicate the vertical extent 1504 of the physical region is not included. As shown, four bits are allocated to the #Head_Zone field 1504 in the PZT entry 1500. A ZStartCyl field 1506 provides the Starting cylinder of the physical region z. Twenty-four bits are allocated to the ZStartCyl field 1506. The number of PBA's per track for a recording zone 170 is located in #PBA_Track field 1508. As shown, twelve bits are allocated to the #PBA_Track field 1508.

The starting head is given in a ZStartHead field 1510. Four bits are allocated to the ZStartHead field 1510. A #Cyl_LastSerpent field 1512 provides the number of cylinders covered by the last serpent ("nonstandard serpent") in the recording zone. The value for #Cyl_LastSerpent 1512 can be calculated using any number of functions as are known in the art, and a particular function that is helpful is shown in Equation (1), which is discussed above. A #Cyl_Serpent field 1514 provides number of cylinders per serpent (excluding the last serpent) in the physical region z (again, preferably a recording zone). A LastSerpent field 1516 provides an index to the last serpent in the physical region z. To illustrate, the LastSerpent value for the recording zone containing the serpent 714 in FIG. 7 is two. Two bytes are allocated to each of the #Cyl_LastSerpent field 1512, and the LastSerpent field 1516. One byte is allocated to the #Cyl_Serpent field 1514. A reserved field 1518 is available for firmware. As shown, the reserved field is allocated one byte.

The ATLU 211 can be configured to operate with a selected PZT entry format. Table 2 contains a C code segment that could be implemented in the ATLU 211 to convert a PBA to a PCHS address using the PZT entry format 1500.

TABLE 2

```
ATLU_PBA_PCHS_Conversion (TPCyl,
TPHead, TPBA_Trk)
{
/*Three selected modes of translation:
        Vertical_Track Switch or Horizontal-Track Switch
        Horizontal_Serpentine or Non-Horizontal_Serpentine
        Vertical_Serpentine or Non-Vertical_Serpentine */
TPBA = TLBA + Tslip /*(from DDT)*/
TPBA_Z = TPBA − PZT[z].ZStartPBA /* (index z
from DDT) */
TPTrk_Z = TPBA_Z / PZT[z].#PBA_Trk
TPBA_Trk = TPBA_Z % PZT[z].#PBA_Trk
```

TABLE 2-continued

```
If (Vertical Track Switch)
{
        TPCyl_Z = TPTrk_Z / PZT[z].#Head_Zone
        TPHead_Z = TPTrk_Z % PZT[z].#Head_Zone
        TPCyl = TPCyl_Z + PZT[z].ZStartCyl
        If (Vertical Serpentine)
        {
          If (TPCyl %2)
          {
             TPHead Z = PZT[z].#Head_Zone - TPHead Z - 1
          }
        }
        TPHead = TPHead_Z + PZT[z].ZStartHead
}
If (Horizontal Track Switch)
{
        #Trk_Serpent = PZT[z].#Cyl_Serpent
        * PZT[z].#Head_Zone
        TSerpent = TPTrk_Z / #Trk_Serpent
        #Cyl_TSerpent = PZT[z].#Cyl_Serpent
        If (TSerpent >= PZT[z].LastSerpent)
        {
          TSerpent = PZT[z].LastSerpent
          #Cyl_Tserpent = PZT[z].#Cyl_LastSerpent
        }
        TPTrk_Tserpent = TPTrk_Z - (#Trk_Serpent * TSerpent)
        TPHead_Z = TPTrk_TSerpent / #Cyl_TSerpent
        TPCyl_Tserpent = TPTrk_TSerpent % #Cyl_TSerpent
        If (Horizontal Serpentine)
        {
          If (TPHead_Z % 2)
          {
             TPCyl_Tserpent = #Cyl_TSerpent -
             TPCyl_TSerpent - 1
          }
        }
        If (Vertical Serpentine)
        {
          If (Tserpent % 2)
          {
             TPHead_Z = PZT[z].#Head_Zone - TPHead_Z - 1
          }
        }
        TPHead = TPHead_Z + PZT[z].ZStartHead
        TPCyl = PZT[z].ZStartCyl + TPCyl_TSerpent +
(TSerpent * PZT[z].#Cyl_Serpent)
        }
}
```

In Table 2, PZT[z] is a PZT entry associated with a physical region z (preferably a recording zone). In Table 2, z is the index into the PZT. The index z was obtained from the DDT, in the same manner as the PZT index is obtained when using the DDT together with PZT entry format 900. TLBA is a target LBA, TSlip is a target slip, TPBA is a target PBA. ZStartPBA is the starting PBA in physical region z. TPBA_Z is a target PBA relative to the start of the target physical region z. TPTrk_Z is a target physical track offset relative to the start of target physical region z. TPBA_Trk is a target PBA relative to the start of target track (Target Sector). TPCyl_Z is a target physical cylinder relative to the start of target physical region z. TPHead_Z is a target physical head relative to the start of the target physical region z. TPHead is a target physical head. TPCyl is a target physical cylinder. TPHead, TPCyl, and TPBA_Trk are the outputs of the ATLU _PBA_PCHS_Conversion () routine given in Table 2.

Figure 16:
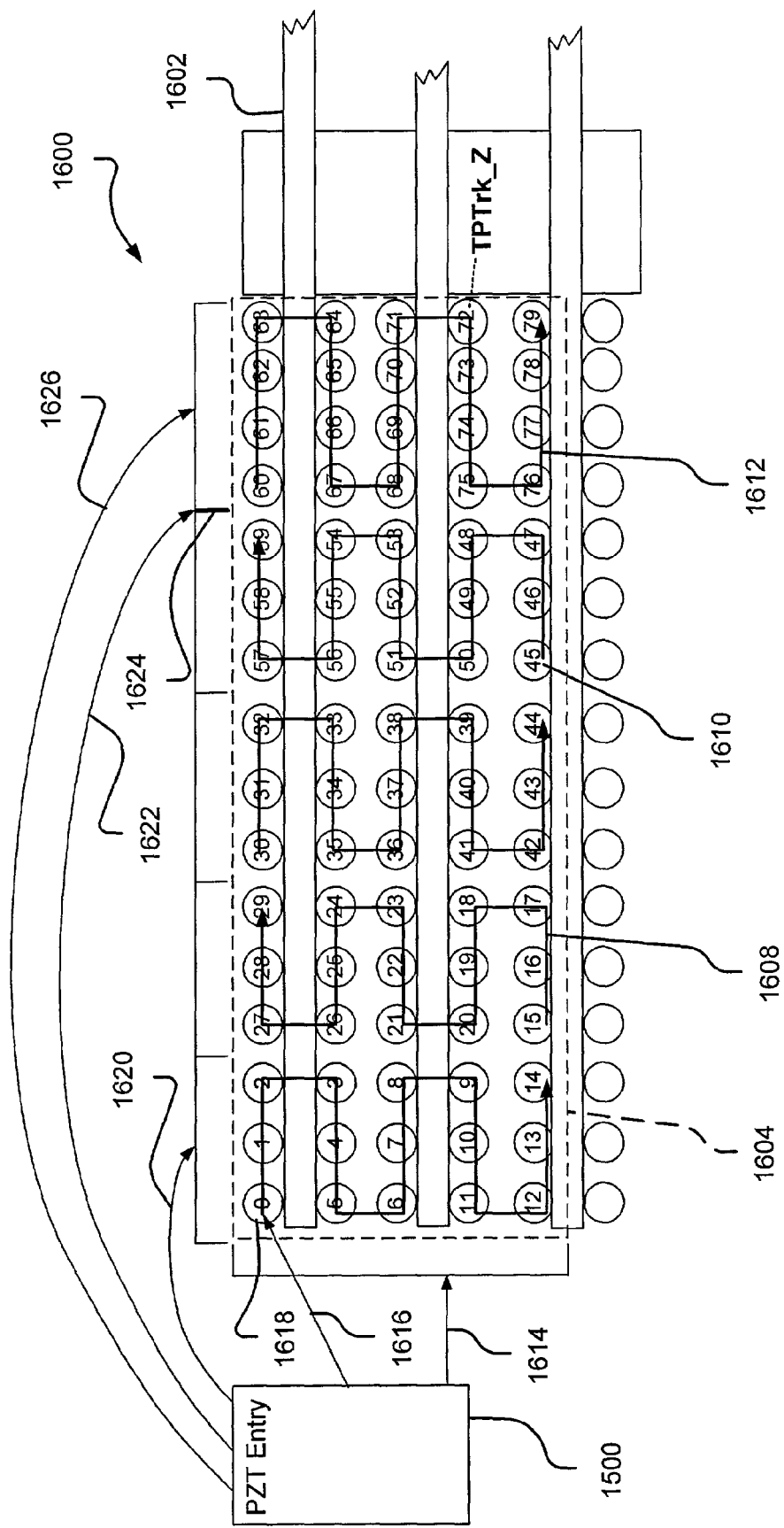
FIG. 16 illustrates a portion of a spindle hub assembly having a zone with five serpents that may be addressed using an embodiment of the PZT entry format of FIG. 15.

FIG. 16 illustrates a portion of a spindle hub assembly 1600 having three discs 1602 and a recording zone 1604 with five serpents 1608. FIG. 16 is used here to illustrate how an embodiment of the PZT entry 1500 may be used to address multiple serpents in a recording zone. FIG. 15 is discussed here in conjunction with FIG. 16. As can be seen, the recording zone 1604 has more than one serpent 1608, wherein the left most four serpents 1608 include three cylinders 1610, and the right most serpent 1612 includes four cylinders 1610. The single PZT entry 1500 is addressing all the serpents 1608 within the recording zone 1604.

In FIG. 16, the #Head_Zone field 1504 in the PZT entry 1500 is referring 1614 to the vertical extent (number of heads) of the recording zone 1604. As shown in FIG. 16, the number of heads in the recording zone 1604 is five. The ZstartCyl field 1506 and the ZStartHead field 1510 of the PZT entry 1500 together are referring 1616 to the starting location 1618 of the recording zone 1604. The #Cyl_Serpent field 1514 is referring 1620 to the number of cylinders per regular serpent 1608 in the zone 1604. The LastSerpent field 1516 is referring 1622 to an index 1624 where the last serpent 1612 of the zone 1604 begins. The index for the last serpent 1612 is four. The #Cyl_LastSerpent 1512 is referring 1626 to the number of cylinders in the last serpent 1612. When using the PZT entry format 1500, the horizontal extent of each associated physical region can be easily found using the #Cyl_Serpent, LastSerpent, and #Cyl_LastSerpent fields of the PZT entry 1500. As always, the DDT 1300 must be carefully arranged so that the correct PZT entry is selected for each LBA and PBA.

The ATLU 211 uniquely includes a number of registers that enable the ATLU 211 to enter a mode for easily accessing the multiple serpents per zone shown in FIG. 16. These registers are a Vertical Track Switch register, a Vertical Serpentining register, a Horizontal Track Switch register, and a Horizontal Serpentining register. In FIG. 16, the Vertical Track Switch register was set equal to zero, the Vertical Serpentining register was set equal to 1, the Horizontal Track Switch register was set equal to 1, and the Horizontal Serpentining register was set equal to 1. Advantageously, when the Vertical Serpentining register is asserted (i.e., has a value of one), the vertical head-switching algorithm shown below in Table 3 is not necessary.

In embodiments described herein, which use the PZT entry formats described above, the logical operations of the ATLU 211 may be implemented as a sequence of computer implemented steps or program modules running on a microprocessor, such as, without limitation, the microprocessor 216. It will be understood to those skilled in the art that the ATLU 211 of the present invention may also be implemented as interconnected machine logic circuits or circuit modules. The implementation is a matter of choice dependent on the performance and cost requirements of the disc drive 100 implementing the ATLU 211. The operation, structural devices, acts, and/or modules described herein may be implemented in software, in firmware, in special purpose digital logic, and/or any combination thereof without deviating from the spirit and scope of the present invention as recited within the claims attached hereto.

Figure 14:
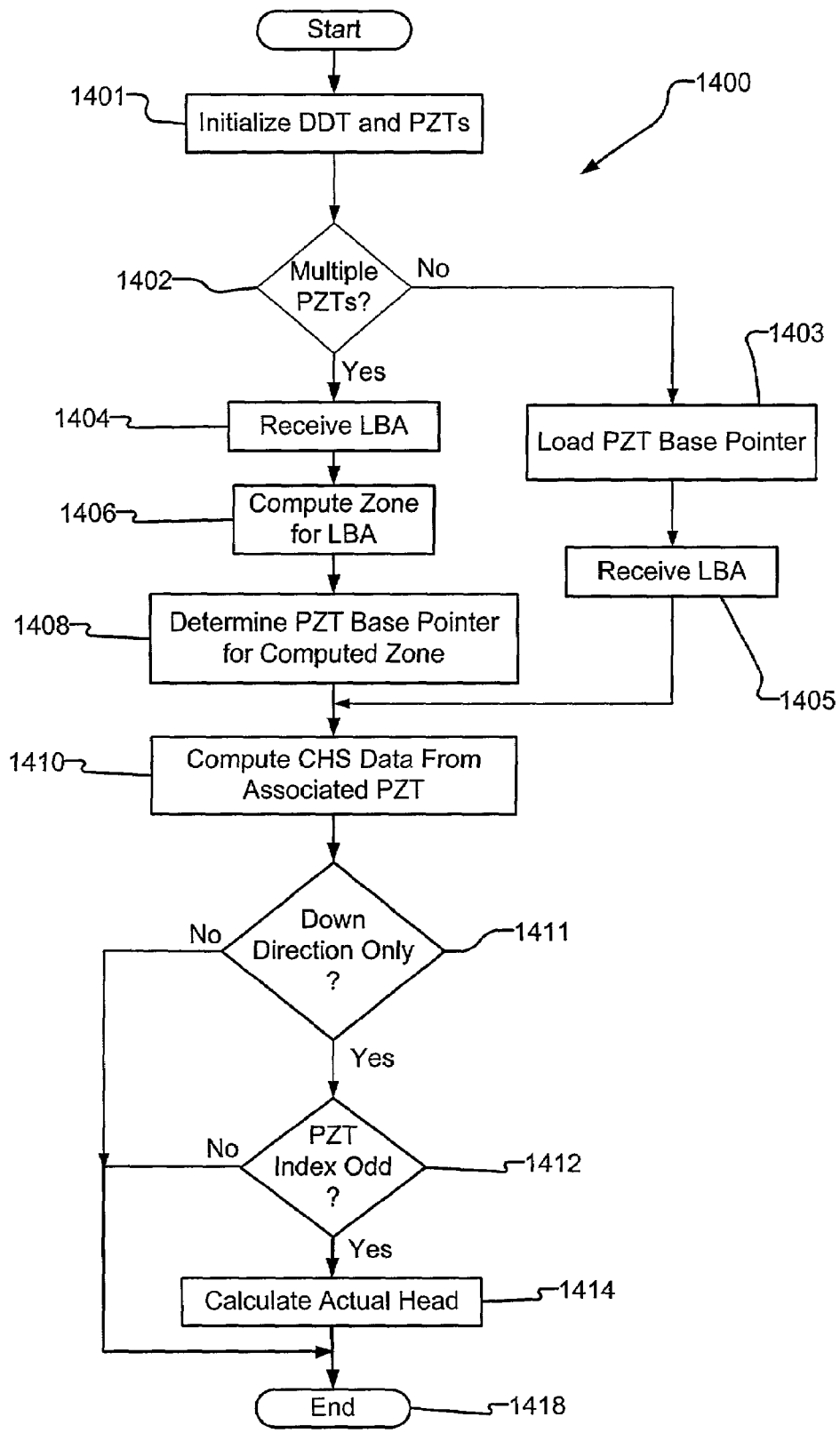
FIG. 14 is a flow chart illustrating a method of using the DDT, PZT, and surface-based serpentine recording format to read and write data from and to the data disc of FIGS. 1–3.

In the previous sections, a system level overview of the operation of an exemplary embodiment of the invention is described. In the following sections, the particular methods performed by a disc drive 100 executing an exemplary embodiment are described by reference to a series of flowcharts. The methods to be performed by a disc drive 100 constitute computer programs made up of computer-executable instructions. The computer programs may be executed by the ATLU 211 in combination with other modules in the disc drive 100 shown in FIG. 2. Describing the methods by reference to a flowchart enables one skilled in the art to develop such programs including such instructions to carry out the methods on suitable computing devices (the microprocessor executing the instructions from computer-readable media). The methods are illustrated in FIG. 14 and are inclusive of the steps or acts required to be taken by the disc drive 100 operating in the environment shown in FIG. 2. The various software routines or software modules described herein may be implemented by any means known in the art. For example, any number of computer programming languages, such as "C", "C++", Pascal, FORTRAN, assembly language, Java, etc., may be used. By way of further example, and not limitation, any scripting language known in the art may be used, such as Korn shell script. Furthermore, various programming approaches such as procedural, object oriented or artificial intelligence techniques may be employed.

Computer-readable instructions and data may be included in computer-readable media. Computer-readable media can be any available media that can be accessed by the computer or processor. By way of example, and not limitation, computer-readable media might comprise computer storage media and/or communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Erasable Programmable ROM (EPROM), flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer or processor which is executing the operating code.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

FIG. 14 is a flowchart illustrating an operational flow 1400 for quickly computing a CHS in the disc drive 100 associated with a given target logical address, as may be implemented in embodiments of the components illustrated in FIG. 2. Steps in the operational flow 1400 make use of one or more PZTs as described in embodiments herein. Operation begins with an initializing operation 1401 wherein a DDT (e.g., DDT 1300 in FIG. 13) and one or more PZTs are initialized by firmware in dynamic RAM (DRAM). The DDT and PZTs may be initialized by copying them from a disc 108 in the disc drive 100 to a memory location in a faster memory device in the disc drive 100, so that they may be accessed quickly during operation. Control transfers to a determining operation 1402 wherein it is determined whether multiple PZTs are being employed. For example, the determining operation 1402 may determine whether a single-PZT embodiment, such a the one described in FIG. 15, or a multiple-PZT embodiment, such as the one described in FIG. 8, is being used. If it is determined that multiple PZTs are not being employed, control transfers to a loading operation 1403. In the loading operation 1403 a base pointer to the PZT (such as the PZT 1500) is loaded into memory in the ATLU 211. In the loading operation 1403, the base pointer is preferably loaded on power up for use throughout operation of the disc drive 100. Control then transfers to a receiving operation 1405 wherein a target LBA is received. The target LBA typically comes from a host computer (e.g., host computer 200), but may also be generated by the disc drive 100.

If, in the determining operation 1402, it is determined that multiple PZTs are being employed, then a based pointer to a PZT must be determined for each LBA. Thus, control transfers to a receiving operation 1404 wherein a target LBA is received from either a host computer 200 or the disc drive 100. A target LBA is generally received when data is to be written to or read from one of the discs 108 in the disc drive 100. The target LBA is received by the host interface 202 and passed to the ATLU 211, which processes the LBA. Control then transfers to a computing operation 1406 wherein a recording zone number is computed that corresponds to the target LBA. After the recording zone is computed in the computing operation 1406, a determining operation 1408 determines a base pointer of a PZT associated with the computed recording zone. The determining operation 1408 may calculate the base pointer using any method known in the art, and is dependent on the size and arrangement of data structures used for the particular implementation of the PZTs. For example, the PZTs may be contiguously aligned in memory and may be allocated a fixed number of bytes. In this example, the determining operation 1408 may calculate the base pointer by adding a multiple (based on the computed recording zone) of the PZT byte size to a starting base address where the PZTs reside in memory. After the determining operation 1408 or the receiving operation 1405, control transfers to a reading operation 1405. The reading operation 1410 reads the data from the PZT to determine a CHS address associated with the target LBA. With the CHS address, the proper disc location in the disc drive 100 can be accessed.

In one implementation, the existing hardware supports only the "down" direction of the serpents. In order to employ the surface-based serpentine format in that implementation (where the "up" and "down" serpent directions are both present), a head value different from the head number computed using the PZT entry is computed. Therefore, a determining operation 1411 determines whether only the down direction is supported. If only the down direction is supported, control transfers to a querying operation 1412. The querying operation 1412 queries whether the PZT index (i.e., PZT entry number) is odd, which indicates that the serpentine direction is up. If the PZT index is odd, a calculating operation 1414 calculates the actual head value. Equation (1) shown below is an exemplary equation for calculating the actual head value.

Actual_Head=Start_Head+(Num_Heads−
(ATLU_Head−Start_Head−1)),     Eq. (1)

where 'Start_Head' and 'Num_Heads' denote the head address range within which recording zone is contained.

To implement Eq. (1) in software using an embodiment of a PZT, the exemplary code in Table 3 may be used.

TABLE 3

Actual_Head = Zone_Table[z].Start_Head +
(Zone_Table[z].Num_Heads −
(ATLU_Head − Zone_Table[z].Start_Head − 1))

'Zone_Table' is a structure representing the recording zones in memory and 'z' is the recording zone number. 'Actual_Head' is the actual head in the PCHS that is determined in the LBA to 15 PCHS translation process. The ATLU_Head is the head number returned by the ATLU (in the embodiment where the ATLU assumes that each serpent is in the down direction). It is to be understood that other conversion algorithms may be used to convert between the ATLU_Head and the Actual_Head.

If the PZT index is even (indicating a downward serpentine direction) or both the up and down serpentine directions are supported, and after the calculating operation 1414, the operational flow 1400 ends. Utilizing an embodiment of the PZT described herein allows for efficient up-down sequencing of heads to traverse multiple serpents within each recording zone, including 'nonstandard serpents'. After the operational flow 1400 ends, the CHS data obtained from the operational flow 1400, may be used to position the transducer heads over the proper cylinder and sector and read the data in the sector with the proper head in a surface-based serpentine format.

In summary, an embodiment of the present invention may be viewed as a method (such as 1400) of accessing data in a disc drive (such as 100) by retrieving (such as 1410) addressing data (such as 900–916, 1500–1518) to address multiple data arrangements (such as 542, 544, and 548) in a recording zone (such as 170) of the disc drive (such as 100) traversing (such as 542, 544, and 548) the data arrangements (such as 542, 544, and 548) using the addressing data (such as 900–916, 1500–1518). The addressing data (such as 900–916, 1500–1518) is typically retrieved by receiving (such as 1404) a logical block address, determining (such as 1406) a recording zone (such as 170) associated with the logical block address, accessing (such as 1408) a physical zone table (such as 801) corresponding to the recording zone (such as 170), and reading (such as 1410) corresponding cylinder/head/sector (CHS) data (such as 904, 906, 908, 910, 912, 914, and 916) from the physical zone table entry (such as 802). The method may further include calculating (such as 1410) an entry number (such as 0 (1126)) associated with the serpent (such as 1120), determining (such as 1412) whether the entry number (such as PZT 0 (801)) is odd, and calculating a new head number if the entry number (such as 1414) is odd. Calculating the new head number may be implemented as in Eq. (1) above.

Another embodiment may be viewed as a disc drive (such as 100) having at least one disc (such as 108) with a top surface (such as 1104) and a bottom surface (such as 1106) having tracks (such as 160) for storing data and a physical zone table (such as 801) stored in memory (such as 224) for translating physical block addresses into cylinder/head/sector (CHS) locations. The disc drive further includes microprocessor executable instructions for receiving (such as 1404) a logical block address, computing (such as 1406) a recording zone (such as 170) associated with the logical block address, and accessing (such as 1410) a physical zone table entry (such as 1004) to determine a CHS location associated with the logical block address. Still further, the data in the disc drive (such as 100) may be logically arranged in a serpentine format (such as 710, 712, and 714) on the surfaces (such as 1104 and 1106) and more than one serpent (such as 710) may exist in a recording zone (such as 170). The physical zone table (such as 801) includes entries (such as 802, 1004) indexable by a serpent number (such as 710) associated with a serpent (such as 710) in the recording zone (such as 170). A target LBA is translated into a PBA and PZT index using the DDT (such as 1300) and then to a CHS using the selected PZT, regardless of the PZT entry format. The DDT (such as 1300) is used to translate the target LBA to a {PBA, PZT index} pair.

Yet another embodiment is a data storage device (such as 100) that includes a microprocessor, a data disc (such as 108) for storing data, an actuator assembly (such as 110) carrying transducer heads (such as 118) adjacent the surfaces (such as 1104 and 1106) of the data disc (such as 108), and a means (such as 800) for accessing (such as 1400) data recorded on the surfaces (such as 1104 and 1106) of the data disc (such as 108). This embodiment is particularly useful where data is arranged in a serpentine fashion (such as 710, 712, and 714) and more than one serpent (such as 710) is stored per recording zone (such as 170). The disc access means (such as 800) may include a physical zone table (such as 801) for each recording zone (such as 170), which is indexable by a serpent number (such as 710) that identifies one of the serpents (such as 710) within the recording zone (such as 170). The disc access means may also include a defect descriptor table (such as 1300) that stores a physical zone table index value (such as 1306) associated with a logical block address (such as 402).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous changes may be made which will readily suggest themselves to those skilled in the art and which are encompassed in the spirit of the invention disclosed and as defined in the appended claims.

What is claimed is:

1. A method comprising steps of:
    (a) retrieving addressing data to address data arranged in a multiple serpentine format in a recording zone; and
    (b) traversing the data arrangements using the addressing data.

2. The method of claim 1 wherein the retrieving step (a) comprises steps of:
    (a)(1) determining a recording zone associated with a logical block address from a plurality of recording zones identified on a disc;
    (a)(2) accessing a physical zone table corresponding to the recording zone from a plurality of physical zone tables; and
    (a)(3) computing cylinder/head/sector (CHS) data from a physical zone table entry in the accessed physical zone table.

3. The method of claim 2 further comprising steps of:
    (c) determining if multiple physical zone tables are available; if multiple physical zone tables are available;
    (d) computing a recording zone corresponding to the logical block address; and
    (e) determining a physical zone table base pointer associated with the computed zone.

4. The method of claim 3 wherein the data arrangements are serpents, the physical zone table comprises a plurality of entries, and each entry is associated with a serpent in the determined recording zone, the method further comprising steps of:
    (f) calculating an entry number associated with the serpent;
    (g) determining whether the entry number is odd; and
    (h) if the entry number is odd, computing a new head number.

5. The method of claim 4 wherein the new head number is a function of a number of heads in the disc drive.

6. The method of claim 5 wherein the new head number is further a function of a starting head value in the physical zone table.

7. A disc drive comprising:
a data storage disc having data arranged in a plurality of recording zones; and
a memory that stores a physical zone table for each recording zone that describes the arrangement of the data in the recording zone.

8. The disc drive of claim 7 further comprising:
controller executable instructions operable to compute a recording zone associated with a logical block address.

9. The disc drive of claim 8 further comprising controller executable instructions operable to determine a physical zone table associated with the recording zone to determine a CHS location associated with the logical block address.

10. The disc drive of claim 7 further comprising an address translation logic unit configurable for either a single physical zone table or multiple physical zone tables.

11. The disc drive of claim 8 wherein the data is arranged in a serpentine format.

12. The disc drive of claim 11 wherein more than one serpent exists in a zone.

13. The disc drive of claim 12 wherein the physical zone tables comprise entries indexable by a serpent number associated with a serpent in the zone.

14. The disc drive of claim 13 wherein one of the serpents has a serpent size that differs from the size of the other serpents in the zone.

15. The disc drive of claim 14 wherein a last serpent in the zone has a size that is a function of the total number of cylinders in the zone and a standard serpent size.

16. The disc drive of claim 15 wherein the size of the last serpent is equal to the total number of cylinders modulo the standard serpent size.

17. The disc drive of claim 15 wherein the size of the last serpent is equal to the standard serpent size plus the result of the total number of cylinders modulo the standard serpent size.

18. The disc drive of claim 7 further comprising a second recording zone having one or more data arrangements wherein the physical zone table describes all the data arrangements of both the first and second recording zones.

19. The disc drive of claim 18 wherein the physical zone table is a data structure comprising:
a last serpent field representing an index to a last serpent in the recording zone;
a cylinder per serpent field representing a standard serpent size for all serpents in the recording zone except the last serpent; and
a cylinder per last serpent field representing a last serpent size for the last serpent in the recording lone.

20. The disc drive of claim 19 wherein the last serpent size is equal to a remainder obtained from dividing a total number of cylinders in the recording zone by the standard serpent size.

21. The disc drive of claim 19 wherein the last serpent size is equal to the standard serpent size plus a remainder obtained from dividing a total number of cylinders in the recording zone by the standard serpent size.

22. A data storage device having a data disc with a top surface and a bottom surface for storing data arranged in zones and an actuator assembly carrying transducer beads adjacent the surfaces of the data disc for reading from and writing to the data disc, comprising:
a controller coupled to the actuator assembly operable to position the transducer heads over the disc surfaces; and
a means for accessing data recorded on the surfaces of the data disc in a serpentine fashion wherein more than one serpent is traversed per zone.

23. The data storage device of claim 22 wherein the means for accessing comprises:
a physical zone table for each zone indexable by a serpent number identifying one of the serpents within the zone.

24. The data storage device of claim 22 wherein the means for accessing further comprises:
a defect descriptor table storing a physical zone table index value associated with a logical block address.

* * * * *

UNITED STATES PATENT AND TRADEMARK OFFICE
CERTIFICATE OF CORRECTION

| | | |
|---|---|---|
| PATENT NO. | : 7,035,961 B2 | |
| APPLICATION NO. | : 10/078217 | |
| DATED | : April 25, 2006 | |
| INVENTOR(S) | : Brian Thomas Edgar et al. | |

It is certified that error appears in the above-identified patent and that said Letters Patent is hereby corrected as shown below:

Front Page (73) "Assignee: Seagate Technologgy LLC, Scotts Valley, CA (US)" *should read* --Assignee: Seagate Technology LLC, Scotts Valley, CA (US)--

Col. 17, Line 5, remove the number 15

Col. 20, Line 12, "lone" *should read* --zone--

Signed and Sealed this

First Day of August, 2006

JON W. DUDAS
*Director of the United States Patent and Trademark Office*